US012340098B2

(12) United States Patent
Yanagi et al.

(10) Patent No.: US 12,340,098 B2
(45) Date of Patent: Jun. 24, 2025

(54) DATA SHARING SYSTEM AND DATA SHARING METHOD

(71) Applicant: Hitachi, Ltd., Tokyo (JP)

(72) Inventors: Naoto Yanagi, Tokyo (JP); Shinichiro Seki, Tokyo (JP); Masakuni Agetsuma, Tokyo (JP); Go Uehara, Tokyo (JP)

(73) Assignee: Hitachi Vantara, Ltd., Kanagawa-ken (JP)

( * ) Notice: Subject to any disclaimer, the term of this patent is extended or adjusted under 35 U.S.C. 154(b) by 279 days.

(21) Appl. No.: 18/119,593

(22) Filed: Mar. 9, 2023

(65) Prior Publication Data

US 2024/0201870 A1  Jun. 20, 2024

(30) Foreign Application Priority Data

Dec. 20, 2022  (JP) ................. 2022-203651

(51) Int. Cl.
*G06F 12/00* (2006.01)
*G06F 3/06* (2006.01)

(52) U.S. Cl.
CPC .......... *G06F 3/0622* (2013.01); *G06F 3/0665* (2013.01); *G06F 3/067* (2013.01)

(58) Field of Classification Search
CPC ....... G06F 3/0622; G06F 3/0665; G06F 3/067
USPC ....................................................... 711/163
See application file for complete search history.

(56) References Cited

U.S. PATENT DOCUMENTS

| 9,514,324 | B1* | 12/2016 | Potlapally ........... G06F 21/6218 |
| 2014/0095868 | A1* | 4/2014 | Korthny .................. G06F 21/64 |
| | | | 713/165 |
| 2014/0156960 | A1* | 6/2014 | Simoncelli ........... G06F 21/604 |
| | | | 711/163 |
| 2018/0365676 | A1* | 12/2018 | Studnicka ................ G08G 5/55 |
| 2024/0201870 | A1* | 6/2024 | Yanagi .................... G06F 3/067 |

FOREIGN PATENT DOCUMENTS

JP  2020-087167 A  6/2020

* cited by examiner

*Primary Examiner* — Mohamed M Gebril
(74) *Attorney, Agent, or Firm* — Procopio, Cory, Hargreaves & Savitch LLP

(57) ABSTRACT

To provide a data sharing system and a data sharing method that make it easy to suppress the disclosure of data whose disclosure is restricted according to the location where the data exists, in accordance with the provision of the disclosure restriction.
A data sharing system comprising a storage node having virtual volumes accessed by a readout device, the data sharing system comprising: the storage node comprises: an access setting unit configured to restrict a target readout device from reading data from a target virtual volume in accordance with information on a location of the target readout device accessing the data sharing system and information on a location of the target virtual volume from which the target readout device attempts to read data.

7 Claims, 12 Drawing Sheets

Virtual volume catalog table 221

| Storage node ID | Storage node name | Location | Virtual volume catalog (Virtual volume ID, Virtual volume name) |
|---|---|---|---|
| NodeA1 | hA1 | 123.223.1.323 | (volA1, A1), (volA2, A2) ... |
| NodeB1 | hB1 | 123.456.7.89 | (volB1, 21), (volB2, 23) ... |
| NodeC1 | hC1 | 133.244.3.555 | (volC1, x1), (volC2, x2) ... |
| ... | ... | ... | ... | columns: 601, 602, 603, 604

FIG. 6

Virtual volume management table 321

| Vol ID | Virtual volume name | Disclosure restricted data existence information | Scan date and time | Access permission setting status with the host | | | |
|---|---|---|---|---|---|---|---|
| | | | | HostA1 | HostB1 | HostC1 | ... |
| Vol A1 | 20220605DocA1 | 1 | 202206070005 | 1 | 0 | 0 | ... |
| Vol A2 | 20220605PicA1 | 1 | 0 | 0 | 1 | 0 | ... |
| Vol A3 | 20220610DocA2 | 0 | 202206120005 | 1 | 0 | 0 | ... |
| Vol A4 | 20220610PicA2 | 0 | 202206120015 | 0 | 1 | 0 | ... |
| Vol A5 | 20220620DocA3 | 1 | 0 | 1 | 0 | 0 | ... |
| ... | ... | ... | ... | ... | ... | ... | ... | columns: 701, 702, 703, 704, 705

FIG. 7

Host existence area management table 322

| Host ID | Host existence area name |
|---|---|
| HostA1 | Country A |
| HostB1 | Country B |
| HostC1 | Country C |
| ... | ... | columns: 801, 802

FIG. 8

Virtual volume existence area management table 323

| Virtual volume ID | Virtual volume existence name |
|---|---|
| VolA1 | Country A |
| VolB1 | Country B |
| VolA2 | Country A |
| VolC1 | Country C |
| ... | ... | columns: 901, 902

FIG. 9

Data readable area management table 324

| Virtual volume existence area (1001) | Data readable area name (1002) |
|---|---|
| Country A | Alliance E, Country E |
| Country B | Alliance E |
| Country C | Country C |
| ... | ... |

FIG. 10

Disclosure restricted data type management table 325

| Disclosure restricted data existence area name (1101) | Type (1102) | Data readable area name (1103) | Start timing (1104) |
|---|---|---|---|
| Country A | Name | Alliance E, Country E | 2000.1.1 |
| | Date of birth | Alliance E, Country E | 2000.1.2 |
| | Address | Alliance E, Country E | 2000.1.3 |
| | Telephone number | Alliance E, Country E | 2000.1.4 |
| | Mail address | Alliance E, Country E | 2000.1.5 |
| | Blood type | Alliance E, Country E | 2000.1.6 |
| | Affiliation Information | Alliance E, Country E | 2000.1.7 |
| | ... | ... | ... |
| | Genome Information | Alliance E, Country E | 2024.9 |
| | ... | ... | ... |
| Country B | ... | ... | ... |
| ... | ... | ... | ... |

FIG. 11 disclosure restriction information source management table 326

| Area name (1201) | Disclosure restriction type information source (1202) | Scheduled update date (1203) |
|---|---|---|
| Country A | Website address A | 20221224 |
| Country B | Website address B | 20221224 |
| Country C | Website address C | 20221224 |
| ... | ... | ... |

FIG. 12

Scan schedule setting table 327

| Day | 0:00 | 3:00 | 6:00 | 9:00 | 12:00 | 15:00 | 18:00 | 21:00 |
|---|---|---|---|---|---|---|---|---|
| Mon. | 0 | 0 | 0 | 0 | 0 | 0 | 0 | 0 |
| Tue. | 1 | 0 | 0 | 0 | 0 | 0 | 0 | 0 |
| Wed. | 0 | 0 | 0 | 0 | 0 | 0 | 0 | 0 |
| Thu. | 1 | 0 | 0 | 0 | 0 | 0 | 0 | 0 |
| Fri. | 0 | 0 | 0 | 0 | 0 | 0 | 0 | 0 |
| Sat. | 0 | 0 | 0 | 0 | 0 | 0 | 0 | 1 |
| Sun. | 0 | 0 | 0 | 0 | 0 | 0 | 0 | 1 |

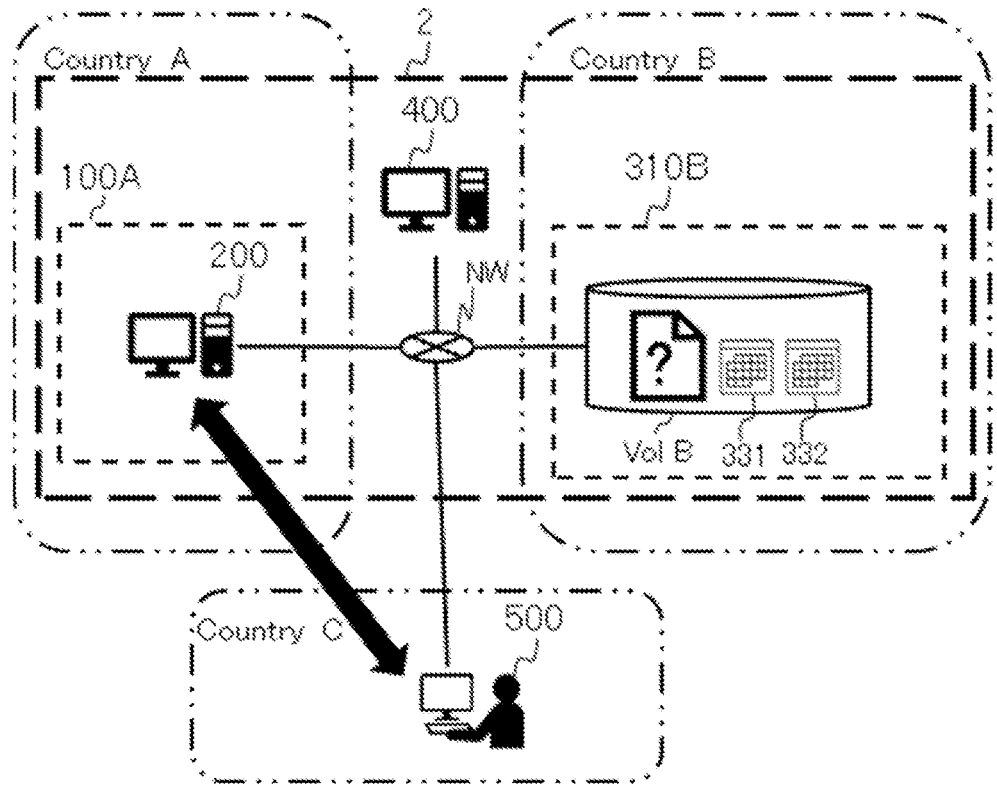

FIG. 19

Virtual volume disclosure range table329

| Virtual volume existence area name | Name of the disclosure range | Storage node ID | Storage node name | Location of the storage node | Vol catalog (VolID,Volname) |
|---|---|---|---|---|---|
| Country A | The entire world | NodeA1 | nA1 | 123.223.1.323 | (volA1, A1), ... |
| Country A | The entire world | NodeB1 | nB1 | 123.456.7.89 | (volB1, 21), ... |
| Country A | ... | ... | ... | ... | ... |
| Country A | the data readable area | NodeA1 | nA1 | 123.223.1.323 | (volA2, A2), ... |
| Country A | ... | ... | ... | ... | ... |
| Country A | Virtual volume existence area (Country A) | NodeA1 | nA1 | 123.223.1.323 | (volA4, A4), ... |
| Country A | ... | ... | ... | ... | ... |
| Country A | Organization A | NodeA1 | nA1 | 123.223.1.323 | (volA6, A6), ... |
| ... | ... | ... | ... | ... | ... |

FIG. 20

DATA SHARING SYSTEM AND DATA SHARING METHOD

BACKGROUND OF THE INVENTION

1. Field of the Invention

The present invention relates to a data sharing system comprising a storage node having virtual volumes accessed by a readout device, the data sharing, and a data sharing method.

2. Description of the Related Art

Various kinds of information are disclosed and shared throughout the world via a computer network (hereinafter, also referred to as a "network"). There are information whose disclosure is restricted, such as personal information whose disclosure is restricted by laws and regulations. Therefore, there are technologies for restricting disclosure of information whose disclosure is restricted.

For example, in JP 2020-87167 A disclosed a data transfer management system that determines whether data including personal information and generated in real time, can be transferred from a region in which handling of data is regulated to the outside, and that manages the transfer of the data. By using the data transfer management system disclosed in JP 2020-87167 A, when data generated in real time includes information whose disclosure is restricted, disclosure of the data can be restricted.

SUMMARY OF THE INVENTION

By the way, the technology disclosed in JP 2020-87167 A, can manages the transfer of data including personal information and generated in real time. Therefore, In the case where disclosing data that does not include personal information or data that is not generated in real time are disclosed, the technology disclosed in JP 2020-87167 A cannot be used. In addition, the technology disclosed in JP 2020-87167 A cannot be used, in the case there are data whose publication is restricted other than personal information, or in the case that sharing modified data generates for ease to use before publishing is preferable.

And in recent years, around the world, regulations protecting personal information and other sensitive information have been tightened year by year. Globally, ¾ of countries or regions (approximately 150 countries) have enacted or are preparing legislation to protect personal information. Laws protecting personal information include, for example, the EU's General Data Protection Regulation (GDPR), China's Personal Information Protection Act (PIPL), and Japan's Personal Information Protection Act. If a company violates these laws and leaks confidential information, not only is the company subject to enormous sanctions, but the company is also subject to social discredit. Therefore, preventing the leakage of confidential information has become a serious issue year by year.

The amount of various data used with networks is growing exponentially. Hybrid cloud environment systems, which use storage devices in a cloud environment as a place to store data in addition to storage devices in a conventional on-premises environment, are increasing year by year. Therefore, there is a need for a technology to prevent leakage of confidential information in hybrid cloud environment systems.

Therefore, an object of the present invention is to provide a data sharing system and a data sharing method that make it easy to suppress the disclosure of data whose disclosure is restricted according to the location where the data exists, in accordance with the provision of the disclosure restriction.

In order to attain the object described above, one aspect of a data sharing system of the invention is a data sharing system comprising a storage node having virtual volumes accessed by a readout device, the data sharing system comprising: the storage node comprises: an access setting unit configured to restrict a target readout device from reading data from a target virtual volume in accordance with information on a location of the target readout device accessing the data sharing system and information on a location of the target virtual volume from which the target readout device attempts to read data.

In addition, one aspect a data sharing method of a data sharing system of the invention is a data sharing method of a data sharing system comprising a storage node having virtual volumes accessed by a readout device, wherein the storage node comprising a processor, the method comprising: by the processor, restricting a target readout device from reading data from a target virtual volume in accordance with information on a location of the target readout device accessing the data sharing system and information on a location of the target virtual volume from which the target readout device attempts to read data.

According to a representative form of the present invention, it is made easier to suppress the disclosure of data whose disclosure is restricted according to the location where the data exists, in accordance with the provision of the disclosure restriction.

Objects, configurations, and effects other than those described above will be obvious by the following description of Example.

BRIEF DESCRIPTION OF THE DRAWINGS

FIG. 6 is a diagram showing an example of a virtual volume catalog table;

FIG. 7 is a diagram showing an example of a virtual volume management table;

FIG. 8 is a diagram showing an example of a host existence area management table;

FIG. 9 is a diagram showing an example of a virtual volume existence area management table;

FIG. 10 is a diagram showing an example of a data readable area management table;

FIG. 11 is a diagram showing an example of a disclosure restricted data type management table;

FIG. 12 is a diagram showing an example of a disclosure restriction information source management table;

FIG. 19 is an explanatory diagram showing an outline of processing of the data sharing system according to the second embodiment;

FIG. 20 is a diagram showing an example of a virtual volume disclosure range table.

DETAILED DESCRIPTION OF THE PREFERRED EMBODIMENTS

Figure 1:
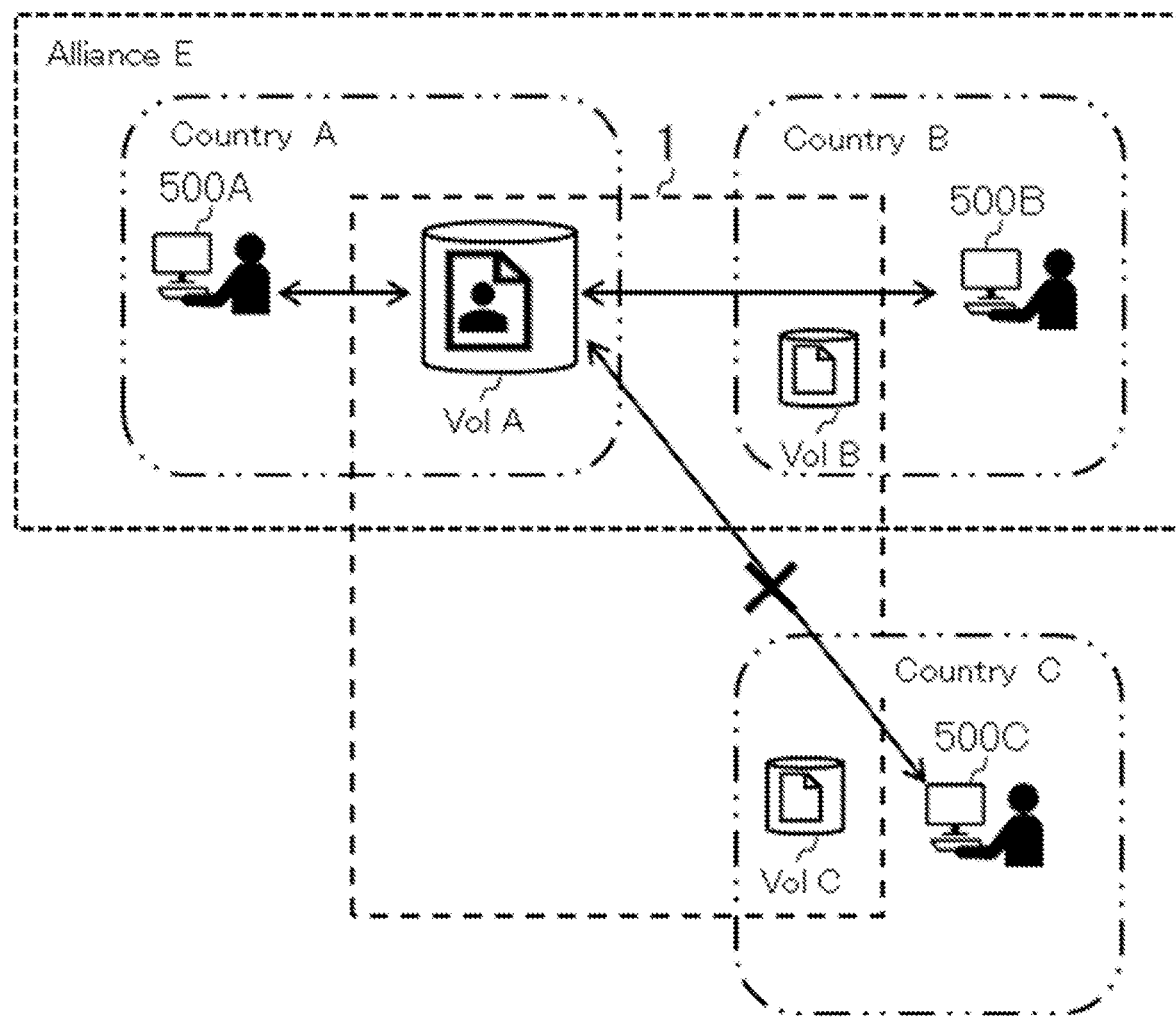
FIG. 1 is an explanatory diagram for explaining the outline of the functions of a data sharing system according to the first embodiment.

Hereinafter, Example of the invention will be described with reference to the drawings. However, the present invention should not be construed as being limited to the description of the following examples. It is easily understood by those skilled in the art that the specific configuration can be modified without departing from the spirit and scope of the present invention.

In the configuration of the invention described below, the same or similar configurations or functions are denoted by the same reference numerals, and redundant description will be omitted.

In this specification and the like, expressions such as "first", "second", and "third" are used to identify components, and do not necessarily limit the number or order of components.

Herein, in this specification and the like, an expression "XX table" may be used as an example of various types of information, but the information may be expressed by a data structure such as an "XX list" or an "XX queue." When describing the identification information, expressions such as "identification information", "identifier", "name", "ID", and "number" are used, but these can be replaced with each other.

In the examples of this specification, processing performed by executing a program may be described. Here, the computer executes a program by means of a processor (CPU, GPU, for example), and performs processing determined by the program while using storage resources (for example, memory), interface devices (for example, communication ports), or the like. Therefore, the subject of the processing performed by executing the program may be the processor. Similarly, the subject of the processing performed by executing the program may be a controller, a device, a system, a calculator, or a node including the processor. The subject of the processing performed by executing the program may be an operation unit, or may include a dedicated circuit performing specific processing. Here, the dedicated circuit, for example, is a field programmable gate array (FPGA), an application specific integrated circuit (ASIC), a complex programmable logic device (CPLD), or the like.

A program may be installed on a computer from a program source. The program source may be, for example, a program distribution server or a storage medium readable by a computer. When the program source is a program distribution server, the program distribution server may include a processor and a storage resource that stores a program to be distributed, and the processor of the program distribution server may distribute the program to be distributed to another computer. Further, two or more programs may be implemented as one program, or one program may be implemented as two or more programs.

First Embodiment

FIG. 1 is an explanatory diagram for explaining the outline of the functions of a data sharing system 1. As shown in FIG. 1, the data sharing system 1 of the first embodiment has a virtual volume for each of a plurality of countries. In the example shown in FIG. 1, the data sharing system 1 has a virtual volume VolA created in the country A, a virtual volume VolB created in the country B, and a virtual volume VolC created in the country C. The virtual volume VolA created in the country A stores the data of personal information. All of the data of personal information stored in the virtual volume VolA is the data permitted to be disclosed in the country A (i.e., data for which the person of the personal information agrees to be disclosed in the country). On the other hand, the virtual volume VolB created in the country B and the virtual volume VolC created in the country C do not store personal information.

Country A and Country B are members of Alliance E. On the other hand, Country C is not a member of Alliance E. According to the treaty of Alliance E, personal information that is permitted to be disclosed domestically is also permitted to be disclosed among countries that are members of Alliance E. For example, personal information that exists in Country A is permitted to be disclosed in Country A. Therefore, according to the treaty of Alliance E, personal information stored in virtual volume VolA is permitted to be disclosed in Country A and Country B. On the other hand, personal information stored in virtual volume VolA is prohibited from being disclosed in Country C, which is not a member of Alliance E.

Therefore, the data sharing system 1 permits the end user terminal 500A in the country A and the end user terminal 500B in the country B to read the personal information stored in the virtual volume VolA. On the other hand, the data sharing system 1 prohibits the end user terminal 500C in the country C which is not a member of the alliance E from reading the personal information stored in the virtual volume VolA.

The end user terminal 500A in the country A, the end user terminal 500B in the country B, and the end user terminal 500C in the country C can read the information stored in the virtual volume VolB and the virtual volume VolC which do not store the personal information.

The above can be rephrased as follows. The end user terminals 500A to 500C are target readout devices. A target readout device is a device that attempt to retrieve data stored in a virtual volume.

virtual volume VolA is a target virtual volume. The target virtual volume is the virtual volume from which the target readout device attempts to read data.

Personal information is a type of disclosure restricted data. Disclosure restricted data refers to data whose disclosure is restricted, such as personal information.

The country name "A" is the name of the disclosure restricted data existence area corresponding to the disclosure restricted data (personal information) stored in virtual volume Volume A. The disclosure restricted data existence area is a range (area) to which the rule (law, etc.) that defines the disclosure range of disclosure restricted data such as personal information is applied.

The personal information stored in virtual volume VolA is disclosure restriction permitted data that is permitted to be disclosed in the disclosure restricted data existence area (Country A) corresponding to disclosure restricted data (personal information) stored in virtual volume VolA. The disclosure restriction permitted data is the data permitted to be disclosed in the disclosure restricted data existence area including the location where the disclosure restricted data exists.

Country A and Country B are the countries in the data readable area corresponding to the disclosure restriction permitted data (personal information) stored in virtual volume VolA. The data readable area is an area (including the disclosure restricted data existence area) in which data permitted to be disclosed (disclosure restriction permitted data) is permitted to be disclosed in the disclosure restricted data existence area corresponding to a position where disclosure restricted data (for example, personal information) exists. For example, under Japanese law, personal information that is permitted to be disclosed in Japan (for example, personal information that the person who can be identified by personal information has consented to disclosure) is permitted to be disclosed in the EU and the UK. In this case, Japan, the EU and the UK are data readable areas.

<<Configuration of Data Sharing System 1>>

Figure 2:
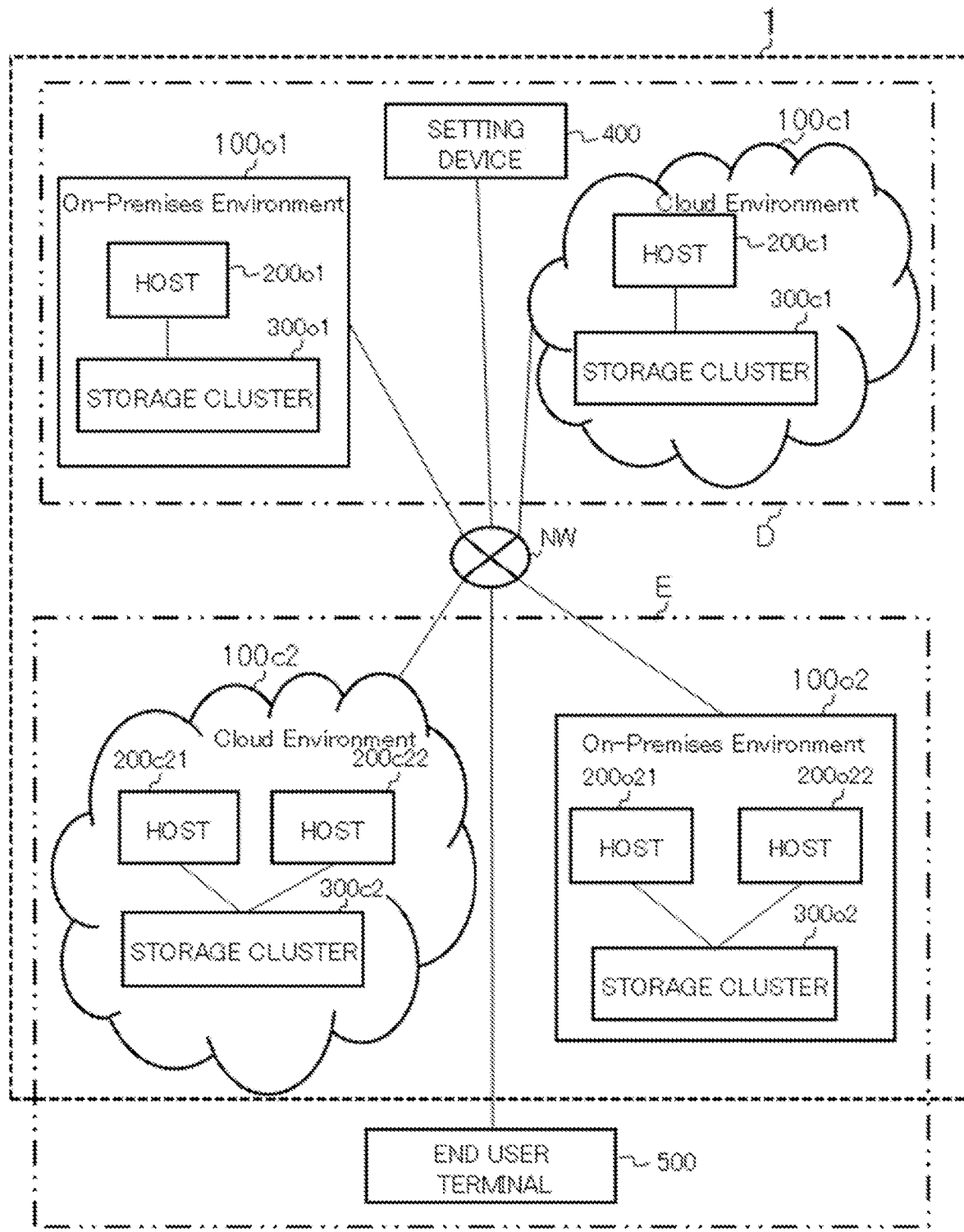
FIG. 2 is an example of a system configuration diagram of an outline of the data sharing system according to the first embodiment.

Next, FIG. 2 is an example of a system configuration diagram of an outline of the data sharing system. As shown in FIG. 2, the data sharing system 1 includes storage systems 10o1, 10o2, 100c1, and 100c2 provided in a plurality of countries, and a setting device 400. These virtual storage environments 10o1, 10o2, 100c1, and 100c2 are connected to the setting device 400 via a network NW.

The storage system 100 is a generic name of the storage systems 10o1, 10o2, 100c1, and 100c2. The storage system 100 has a host 200 and a storage cluster 300. The storage system 100 includes a storage system of an on-premises environment and a storage system of a cloud environment. The storage system 100 may be a storage system of a virtual system. The storage systems 10o1 and 10o2 are storage systems of an on-premises environment. The storage systems 100c1 and 100c2 are storage systems of a cloud environment. There is no limitation on the number and arrangement of the storage systems 100 in the data sharing system 1.

In FIG. 2, the storage system 10o1 in the on-premises environment and the storage system 100c1 in the cloud environment is located in Country D as an example, and the storage system 10o2 in the on-premises environment and the storage system 100c2 in the cloud environment are located in Country E as an example. Like this, the storage systems 100 are located in a plurality of countries. In other words, the storage systems 100 are located in a plurality of regions.

As shown in FIG. 2, the number of hosts 200 included in one storage system 100 is one or more. In FIG. 2, the storage systems 10o1 and 100c1 having one host 200 and the storage systems 10o2 and 100c2 having two hosts 200 are shown as examples.

The setting device 400 stores programs and data used to change various settings of the storage system 100, as described below. The user of the host 200 (administrator of the storage system 100) can operate the host 200 to acquire programs and data from the setting device 400, and use the acquired programs and data to perform various settings of the storage system 100.

The network NW may be a global network, such as the Internet.

<Configuration of Storage System 100>

Figure 3:
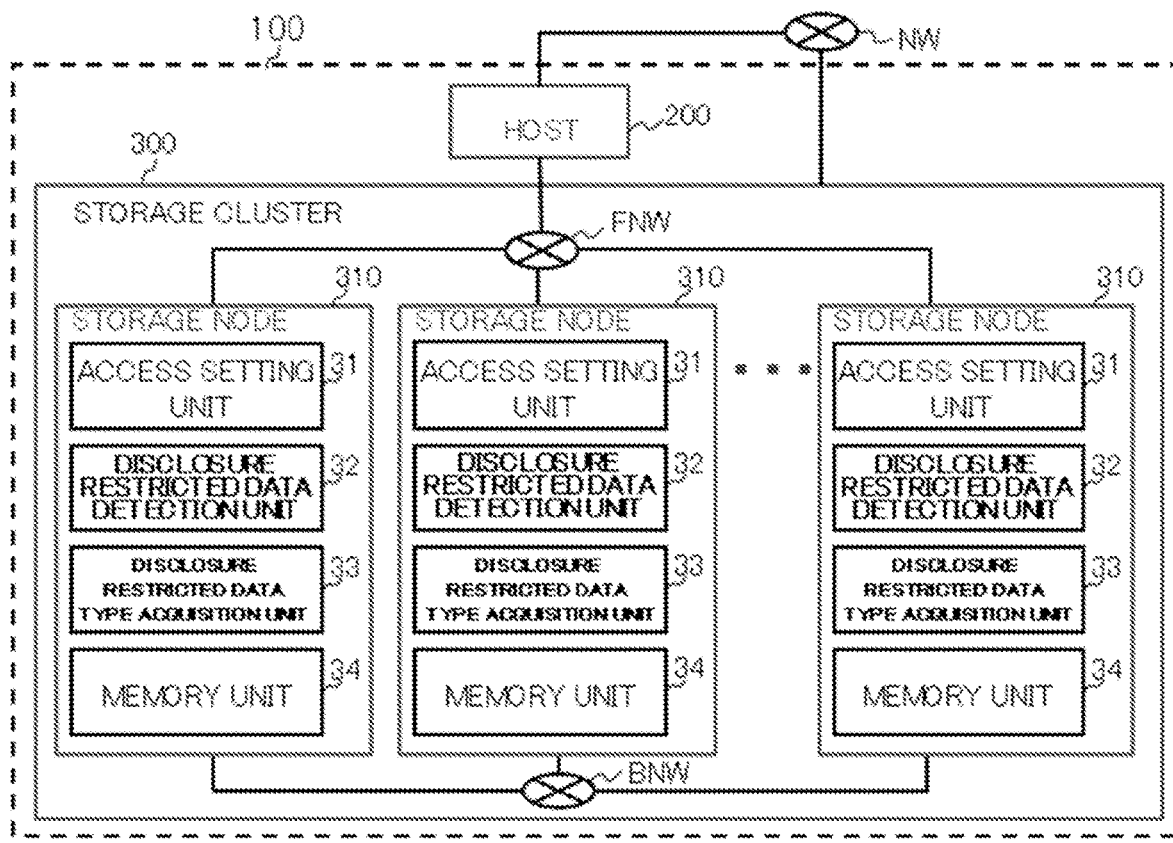
FIG. 3 is a block diagram showing an example of a function block diagram of the storage system according to the first embodiment.

FIG. 3 is a block diagram showing an example of a function block diagram of the storage system 100. The storage system 100 is a device having a plurality of virtual volumes and capable of storing data transmitted from a device such as a server.

The storage system 100 has at least one host 200 and at least one storage cluster 300. The storage system 100 may be a virtual system. The storage system 100 of the on-premises environment and the storage system 100 of the cloud environment have configurations shown in FIG. 3 as an example.

<Configuration of Storage Cluster 300>

As shown in FIG. 3, the storage cluster 300 includes a plurality of storage nodes 310, and a front end network FNW and a back end network NW for connecting the storage nodes 310 to each other. The front end network FNW is connected to the host 200. The storage cluster 300 is connected to network NW.

The storage node 310 of the storage system 100 in the cloud environment is referred to as the storage node 310 of the cloud environment. The storage node 310 of the storage system 100 in the on-premises environment is referred to as the storage node 310 of the on-premises environment. Therefore, the data sharing system 1 includes, as the storage node 310, the storage node 310 of the cloud environment and the storage node 310 of the on-premises environment.

Details are described below, each of the storage nodes 310 included in the storage cluster 300 has an access setting unit 31, a disclosure restricted data detection unit 32, a disclosure restricted data type acquisition unit 33, and a memory unit 34 as functional configurations.

The front end network FNW and the back end network BNW may be networks, for example, the Internet, local area networks (LANs), wired networks, or wireless networks.

<Configuration of Host 200>

Figure 4:
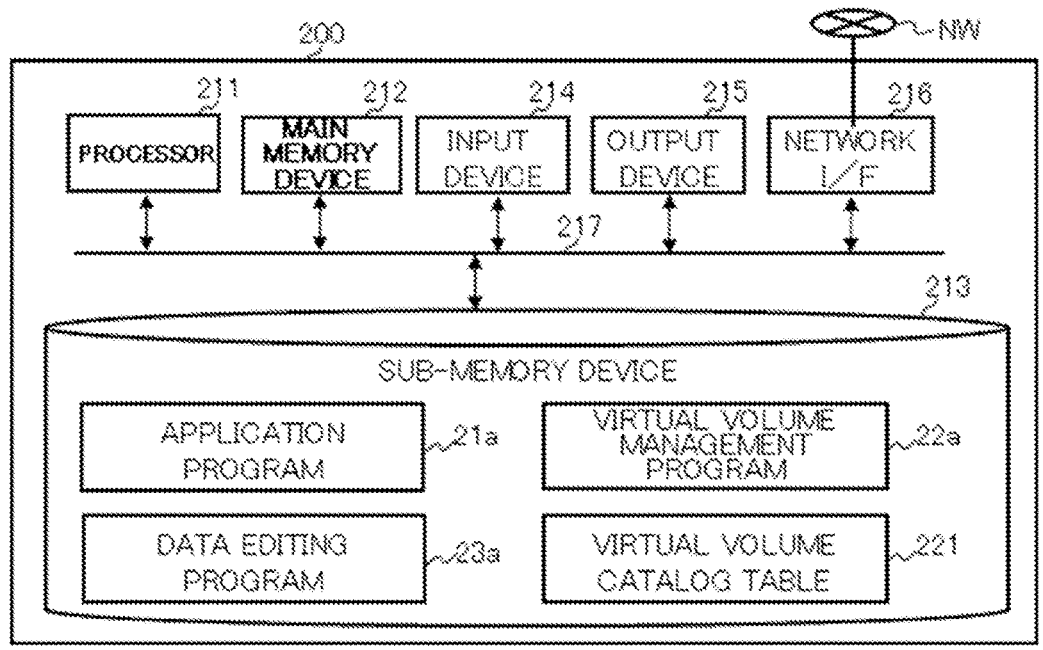
FIG. 4 is a block diagram showing an example of a hardware configuration of a host according to the first embodiment.

FIG. 4 is a block diagram showing an example of a hardware configuration of a host 200. As shown in FIG. 4, the host 200 has, as a hardware configuration, a processor 211, a main memory device 212, a sub-memory device 213, an input device 214, an output device 215, an NWI/F (Interface) 216, and a bus 217 for connecting these components. The host 200 can be realized by an information processing apparatus such as a general server apparatus.

The processor 211 controls each unit of the host 200, reads out the data and the programs stored in the sub-memory device 213 to the main memory device 212, and executes processing determined by the programs.

The main memory device 212 is a RAM or the like, has a volatile storage element or a nonvolatile storage element, and stores the programs executed by the processor 211 and the data.

The sub-memory device 213 is a hard disk drive (HDD), a solid-state drive (SSD), or the like, has a nonvolatile storage element, and stores programs, data, and the like. The sub-memory device 213 stores application program 21a, virtual volume management program 22a, and virtual volume catalog table 221.

The application program 21a, the virtual volume management program 22a, and the data editing program 23a are programs that the processor 211 reads out to the main memory device 212 and executes. The end user terminal 500 can access the host 200 and make the host 200 to execute the application program 21*a* and the virtual volume management program 22*a*. The application program 21*a* is, for example, a data processing program such as software for analyzing data. The processing of the application program 21*a* includes processing for calling the processing of the virtual volume management program 22*a*. The virtual volume management program 22*a* is a processing program for reading out data from the virtual volume created in the storage cluster 300 using the information stored in the virtual volume catalog table 221.

The data editing program 23*a* is a program that is started by the end user terminal 500 connected to the host 200, and executes a process of editing various tables stored in the storage node 310.

The virtual volume catalog table 221, which will be described in detail later with reference to FIG. 6, stores information of the virtual volume created in the storage node 310. In the processing executed by the application program 21*a*, the processing of the virtual volume management program 22*a* is executed, data is read from the virtual volume created in the storage cluster 300, and the read processing in the processing executed by the application program 21*a* can be used.

The input device 214 is a device for inputting information, including, for example, a keyboard, a switch, and a pointing device. The output device 215 is a device for presenting information, such as a monitor display.

The network I/F 216 is connected to the network NW, and is an interface (transmission/reception device) capable of transmitting and receiving data to and from the storage cluster 300, the setting device 400, the end user terminal 500, and the like via the network NW.

Note that, the setting device 400 and the end user terminal 500 have hardware resources similar to those of the host 200 shown in FIG. 4, and can be realized by an information processing apparatus such as a general server apparatus.

<Configuration of Storage Node 310>

Figure 5:
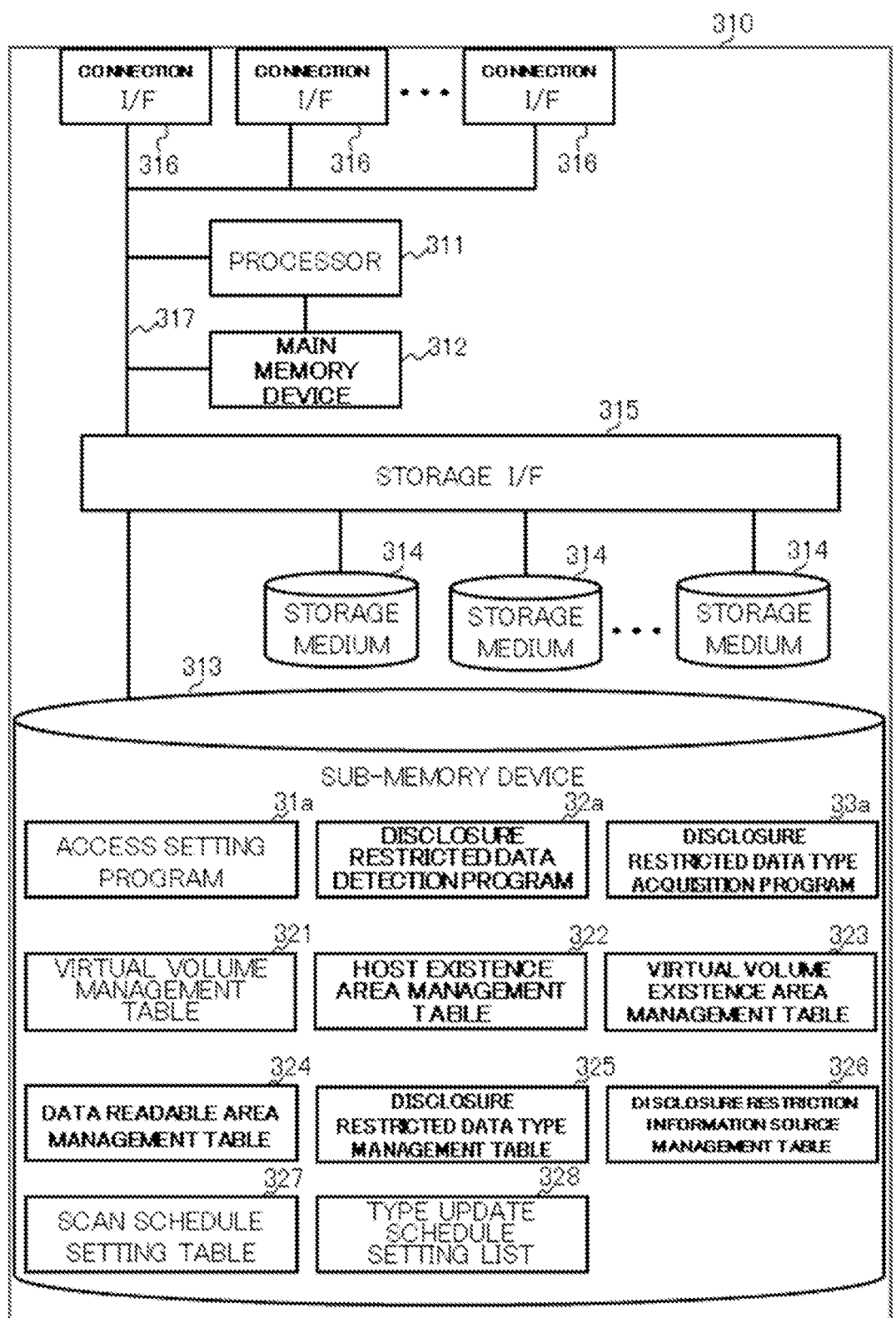
FIG. 5 is a block diagram showing an example of a hardware configuration of a storage node according to the first embodiment.

FIG. 5 is a block diagram showing an example of a hardware configuration of a storage node 310. As shown in FIG. 5, the storage node 310 has, as a hardware configuration, a processor 311, a main memory device 312, a sub-memory device 313, a storage medium 314, a storage interface (I/F) 315, a connection interface (I/F) 316, and a bus 317 for connecting these components.

The processor 311 controls each unit of the storage node 310, reads out the data and the program stored in the sub-memory device 313 to the main memory device 312, and executes processing determined by the program.

The main memory device 312 is a RAM or the like, has a volatile storage element or a nonvolatile storage element, and stores the programs executed by the processor 131 and the data.

The sub-memory device 313 is a hard disk drive (HDD), a solid-state drive (SSD), or the like, has a non-volatile storage element, and stores the programs, the data, and the like. The sub-memory device 313 stores access setting program 31*a*, disclosure restricted data detection program 32*a*, disclosure restricted data type acquisition program 33*a*, virtual volume management table 321, host existence area management table 322, virtual volume existence area management table 323, data readable area management table 324, disclosure restricted data type management table 325, disclosure restriction information source management table 326, and scan schedule setting table 327.

As shown in FIG. 3, the storage node 310 has, as functional units, an access setting unit 31, a disclosure restricted data detection unit 32, and a disclosure restricted data type acquisition unit 33. The access setting unit 31 is realized by the processor 311 reading out an access setting program 31*a* stored in the sub-memory device 313 to the main memory device 312 and executing the program. Similarly, the disclosure restricted data detection unit 32 is realized by the processor 311 reading out a disclosure restricted data detection program 32*a* stored in the sub-memory device 313 to the main memory device 312 and executing the program. The disclosure restricted data type acquisition unit 33 is realized by the processor 311 reading out a disclosure restricted data type acquisition program 33*a* stored in the sub-memory device 313 to the main memory device 312 and executing the program. In the present specification, when the processing is described with a statement whose subject is the access setting unit 31, the disclosure restricted data detection unit 32, and the disclosure restricted data type acquisition unit 33, it indicates that the processor 311 of the storage node 310 executes the access setting program 31*a*, the disclosure restricted data detection program 32*a*, and the disclosure restricted data type acquisition program 33*a* that realize the functional units.

The access setting unit 31 determines whether the host 200 accessing the storage node 310 can be permitted to read the data stored in the virtual volume, and sets the host 200 to read the data stored in the virtual volume according to the determination result.

The disclosure restricted data detection unit 32 scans the virtual volume to detect disclosure restricted data (personal information), and stores, in the virtual volume management table 321, information on whether disclosure restricted data (personal information) whose disclosure is restricted is stored in the virtual volume.

A disclosure restricted data type acquisition unit (33) acquires information relating to a change in a provision restricting disclosure, and stores an execution schedule of a change in the provision restricting disclosure and a process corresponding to the change in the provision restricting disclosure.

The virtual volume management table 321, whose details are described below with reference to FIG. 7, stores information of a virtual volume created in the storage medium 314 of the storage node 310.

The host existence area management table 322, whose details are described below with reference to FIG. 8, stores information on the location of the host 200.

The virtual volume existence area management table 323, whose details are described below with reference to FIG. 9, stores information on the location where the virtual volume exists.

The data readable area management table 324, whose details are described below with reference to FIG. 10, stores information on the extent to which disclosure of personal information (disclosure restricted data) stored in the virtual volume is permitted.

The disclosure restricted data type management table 325, whose details are described below with reference to FIG. 11, is data stored in the virtual volume, and stores data relating to the type of information whose disclosure is restricted and information on the time when the disclosure restriction is started.

The disclosure restriction information source management table 326, whose details are described below with reference to FIG. 12, stores information on locations where information of specifying the type of the disclosure restricted data is published.

The scan schedule setting table 327, which will be described in detail later with reference to FIG. 14, stores information on the date and time when the disclosure restricted data detection unit 32 scans the virtual volume so as to detect disclosure restricted data (personal information).

The type update schedule setting list 328 stores information of the date and time when the disclosure restricted data type acquisition unit 33 (see FIG. 3) executes (C) disclosure restricted data type acquisition processing to acquire information of the type of the disclosure restricted data (personal information) to be detected for the virtual volume. Note that the type update schedule setting list 328 stores the date and time in the form of a list. The figure and detailed description of the type update schedule setting list 328 are omitted.

The storage medium 314 is an HDD (Hard Disk Drive), an SSD (Solid State Drive), or the like, and is a device having a nonvolatile storage element and in which a virtual volume is created.

A storage I/F (Interface) 315 is an interface (transmission/reception device) between the storage medium 314 and the processor 311.

A connection I/F (Interface) 316 is an interface (transmitting and receiving device) with a network (front end network FNW and back end network BNW) outside the storage node 310.

<<Data Configuration of Data Sharing System 1, FIG. 6 to FIG. 12>>

Next, the data structure of various data used in the data sharing system 1 is explained with reference to FIGS. 6 to 12.

FIG. 6 is a diagram showing an example of a virtual volume catalog table. The virtual volume catalog table 221 is stored in the host 200. The virtual volume catalog table 221 has, as fields, a storage node ID 601, a storage node name 602, a location 603, and a virtual volume catalog 604.

The storage node ID 601 is an ID for identifying the storage node 310. The storage node name 602 is the name of the storage node 310. The location 603 is information representing the location of the storage node 310. The location 603 is, for example, the IP address of the storage node 310. The virtual volume catalog 604 is a list of virtual volumes created in the storage node 310. The virtual volume catalog 604 stores information of one virtual volume in the format of "(virtual volume ID, name of virtual volume)". In the virtual volume catalog 604, the virtual volume ID is information for identifying the virtual volume. In addition, between the information of one virtual volume and the information of one virtual volume are separated by ",". In the present embodiment, the virtual volume ID is one value. The virtual volume ID only needs to be able to specify one logical volume. Various types of virtual volume IDs can be used as the virtual volume ID. The virtual volume ID may be a set of a plurality of IDs (for example, a set of the ID of the storage device in which the virtual volume is created and the ID of the virtual volume). In the present embodiment, when the virtual volume ID consisting of a set of a plurality of IDs is used as the virtual volume ID for specifying one logical volume, the virtual volume ID is described as one value obtained by collecting a set of a plurality of IDs.

FIG. 7 is a diagram showing an example of a virtual volume management table (virtual volume management information) 321. The virtual volume management table 321 is stored in the storage node 310. The virtual volume management table 321 stores information relating to the virtual volume created in the storage node 310 that stores the virtual volume management table 321. The virtual volume management table 321 has, as fields, a Vol ID 701, a virtual volume name 702, disclosure restricted data existence information 703, a scan date and time 704, and an access permission setting status 705 with the host. The disclosure restricted data existence information 703 saves the value of "1", in the case where the disclosure restriction permitted data is stored in a virtual volume or in the case where disclosure restriction permitted data is sufficiently likely to be stored in the virtual volume (i.e., the virtual volume has not been scanned to detect whether the virtual volume contains disclosure restricted data in disclosure restricted data detection processing (see FIG. 17), as described below). On the other hand, the disclosure restricted data existence information 703 saves the value of "0", in the case where the disclosure restriction permitted data is not stored in the virtual volume.

The scan date and time 704 is the date and time when the storage node 310 (disclosure restricted data detection unit 32) executed the scan to determine whether disclosure restricted data is included in the virtual volume in the disclosure restricted data detection processing which is described later. In the case where the value of the scan date and time 704 is "0", it means that the scan is necessary for the virtual volume.

The host access permission setting status 705 indicates whether the host 200 is permitted to read data from the virtual volume. The host access permission setting status 705 has a columns of host ID for identifying the host 200. The column of the host ID stores a value indicating whether the host 200 of the host ID of the column is permitted to read data from the virtual volume. A value of "1" in the column of the host ID indicates that the host 200 of the host ID of the column is permitted to read data from the virtual volume. On the other hand, a value of "0" in the column of the host ID indicates that the host 200 of the host ID of the column is not permitted to read data from the virtual volume.

FIG. 8 is a diagram showing an example of a host existence area management table (host existence area management information) 322. The host existence area management table 322 is stored in the storage node 310. The host existence area management table 322 has, as fields, a host ID 801 and a host existence area name 802. The host ID 801 is the ID for identifying the host 200. The host existence area name 802 is the name of the area where host 200 resides (the area containing the location of host 200).

FIG. 9 is a diagram showing an example of a virtual volume existence area management table (virtual volume existence area management information) 323. The virtual volume existence area management table 323 is stored in the storage node 310. The virtual volume existence area management table 323 has, as fields, a virtual volume ID 901 and a virtual volume existence name 902. The virtual volume ID 901 is an ID for identifying the virtual volume. The virtual volume existence name 902 is the name of an area in which the virtual volume exists (the area including the location of the virtual volume). The virtual volume existence area management table 323 stores information on the virtual volume created in the storage node 310 storing the virtual volume existence area management table 323.

FIG. 10 is a diagram showing an example of a data readable area management table (data readable area management information) 324. The data readable area management table 324 is stored in the storage node 310. The data readable area management table 324 has, as fields, a virtual volume existence name 1001 and a data readable area name 1002. The virtual volume existence name 1001 is the name of the virtual volume existence area. The data readable area name 1002 is the name of the data readable area corresponding to the virtual volume existence area indicated by the virtual volume existence name 1001.

FIG. 11 is a diagram showing an example of a disclosure restricted data type management table (disclosure restricted data type management information) 325. The disclosure restricted data type management table 325 is stored in the storage node 310. The disclosure restricted data type management table 325 has, as fields, a virtual volume existence name 1101, a type 1102, a data readable area name 1103, and an implementation start timing 1104. The virtual volume existence name 1101 is the name of the virtual volume existence area. The type 1102 is the type of disclosure restricted data. The data readable area name 1103 is the name of the data readable area for the data corresponding to type 1102. The implementation start timing 1104 is the time when the provision for setting the data of type 1102 to be prohibited from disclosure in the virtual volume existence area of the virtual volume existence name 1101 becomes effective.

FIG. 12 is a diagram showing an example of a disclosure restriction information source management table (disclosure restriction information source management information) 326. The disclosure restriction information source management table 326 is stored in the storage node 310. The disclosure restriction information source management table 326 has, as fields, a region name 1221, a disclosure restriction type information source 1202, and a scheduled update date 1203. The region name 1221 is the name of a virtual volume existence area. The disclosure restriction type information source 1202 is the information (IP address, URL, etc.) of the place where the information of the provisions (laws, etc.) of data to be classified as the disclosure restricted data for the area of area name 1221 is published. The scheduled update date 1203 is the information on a date when the storage node 310 is scheduled to update the disclosure restricted data type management table 325 with reference to the disclosure restriction type information source 1202.

Figures 13, 14:
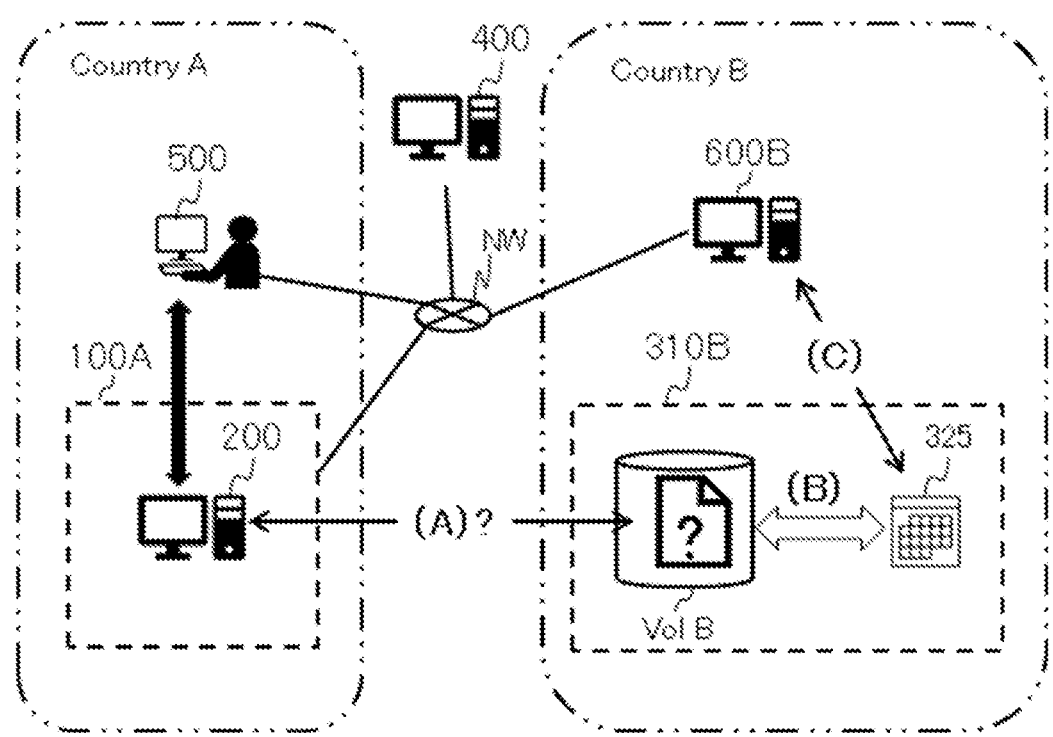
FIG. 13 is a diagram showing an example of a scan schedule setting table.
FIG. 14 is an explanatory diagram showing an outline of processing of the data sharing system according to the first embodiment.

FIG. 13 is a diagram showing an example of a scan schedule setting table 327. The scan schedule setting table 327 is stored in the storage node 310. The scan schedule setting table 327 has, as fields, a day of the week 1301 and times 1302 to 1309. The day of the week 1301 is a day of the week. The times 1302 to 1309 are fields of time. The values of the times 1302 to 1309 are "0" indicating that scanning is performed or "1" indicating that scanning is not performed. On the day of the week 1301 in the row, at the time when the value of the column of times 1302 to 1309 is "1", the disclosure restricted data detection unit 32 executes the disclosure restricted data detection processing (see FIG. 17) to scanning the virtual volume to detect disclosure restricted data (personal information).

<<Processing Procedure>>
<Outline of Processing>

FIG. 14 is an explanatory diagram showing an outline of processing of the data sharing system 1. As shown in FIG. 14, in this embodiment, the user can operate end user terminal 500 to access host 200 A of storage system 100 A in the area where end user terminal 500 exists (In FIG. 14, Country A). The end user terminal 500 is set so as not to be able to access the host 200 (not shown) in the area where the end user terminal 500 does not exist (In the example in FIG. 14, Country B). In the example shown in FIG. 14, end user terminal 500 in Country A is accessing host 200 of storage system 100 A in Country A.

The user operates the end user terminal 500 to execute the application program 21a (see FIG. 4) of the host 200 accessed by the end user terminal 500. In the processing of the application program 21a, as described above, the virtual volume created in the storage node 310 can be read by calling the processing that can be executed by the virtual volume management program 22a. In the processing of the virtual volume management program 22a, it is possible to inquire the storage node 310 in which the target virtual volume is created whether the reading of the target virtual volume to be read by the host 200 can be permitted. When the storage node 310 receives an inquiry from the host 200, the access setting unit 31 (refer to FIG. 3) of the storage node 310 executes (A) access setting processing. In the storage node 310, the disclosure restricted data detection unit 32 (refer to FIG. 3) executes (B) disclosure restricted data detection processing. In the storage node 310, the disclosure restricted data type acquisition unit 33 (refer to FIG. 3) executes (C) disclosure restricted data type acquisition processing.

(A) the access setting processing is the process of determining whether the host 200 can access the target virtual volume, and when it is determined that the host 200 can access the target virtual volume, setting the host 200 to be able to access the target virtual volume. FIG. 14 shows that the storage node 310B in the country B executes (A) the access setting processing to determine whether the host 200 in the country A can access the target virtual volume.

(B) disclosure restricted data detection processing is the processing for detecting whether the personal information (disclosure restricted data) whose disclosure is restricted is included in the virtual volumes for which it is necessary to check whether personal information (disclosure restricted data) is included. Here, the virtual volume is, for example, a virtual volume whose stored information has been changed. In (B) disclosure restricted data detection processing, the disclosure restricted data type management table 325 is used to detect whether the virtual volume includes personal information (disclosure restricted data) whose disclosure is restricted. Note that, in this embodiment, the personal information stored in the virtual volume is the disclosure restriction permitted data which is permitted to be disclosed in virtual volume existence area corresponding to the virtual volume. FIG. 14 shows that storage node 310B in country B performs (B) disclosure restricted data detection processing and detects whether the disclosure restricted data is included in virtual volume VolB with reference to disclosure restricted data type management table 325. Here the virtual volume VolB is an example of a virtual volume whose stored information has been changed and has been needs to check among the virtual volume created in storage node 310B.

(C) The disclosure restricted data type acquisition processing is the processing for updating the disclosure restricted data type management table 325 by acquiring and storing the type of information whose disclosure is newly restricted and the information relating to a plan to newly restrict disclosure of information. Here, the type of information whose disclosure is newly restricted and the information relating to a plan to newly restrict disclosure of information are acquired from the server 600B or the like which discloses information relating to a plan to change the type of disclosure restricted data such as personal information (information relating to a change in laws and regulations of personal information, etc.). The acquired the type of information whose disclosure is newly restricted and the information relating to a plan to newly restrict disclosure of information are stored in the disclosure restricted data type management table 325. FIG. 14 shows that the storage node 310B in country B is executing (C) disclosure restricted data type acquisition processing. In (C) disclosure restricted data type acquisition processing, the storage node 310B acquires information from the server 600B that publishes information about a plan to change the type of disclosure restricted data, such as personal information. The storage node 310B saves the type of information whose disclosure is newly restricted and the information relating to a plan to newly restrict disclosure of information, in the disclosure restricted data type management table 325.

Note that, the disclosure restricted data type management table 325 is updated by (C) disclosure restricted data type acquisition processing. And (B) disclosure restricted data detection processing is executed based on the schedule for newly restricting the disclosure of information. As a result, the type of personal information restricted to be disclosed, can be changed as scheduled.

Figure 15:
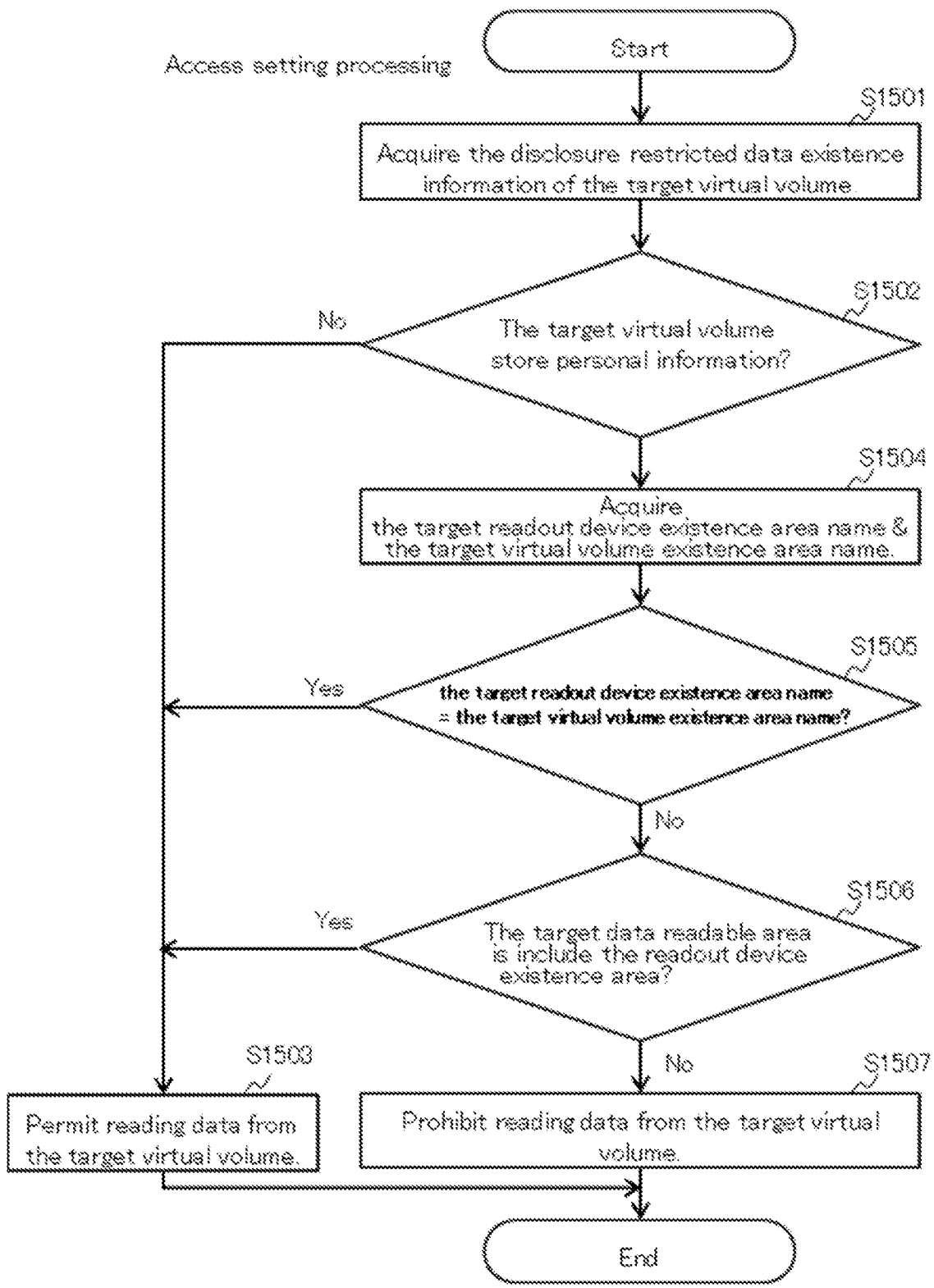
FIG. 15 is a flowchart showing an example of an access setting processing according to the first embodiment.

<(A) Access Setting Processing, FIG. 15>

The user operates the end user terminal 500 to access the host 200 existing in the same virtual volume existence area (for example, the country where the end user terminal 500 exists) as the virtual volume existence area include the country where the user exists. Then, the user operates the end user terminal 500 to execute the application program 21a of the accessed host 200. The application program 21a includes a process of calling the virtual volume management program 22a to read and use the virtual volume created in the storage node 310 as described above.

Here, when the processing of the virtual volume management program 22a is executed, the host 200 refers to the virtual volume catalog table 221, and transmits virtual volume display information including the name of the virtual volume created in the data sharing system 1, its own host ID, and the information indicating that the virtual volume name is to be displayed, to the end user terminal 500. Here, the name of the virtual volume is a type of virtual volume specifying information. The virtual volume specifying information is the information that can specify the virtual volume. Instead of using the name of the virtual volume, information that can specify the virtual volume, such as a virtual volume ID, may be used.

When the end user terminal 500 receives the virtual volume display information from the host 200, the end user terminal 500 displays the name of the virtual volume.

In addition, the user selects the name of the target virtual volume to be read from the name of the virtual volume displayed in the end user terminal 500. Here, the user enters the name of the target virtual volume in the end user terminal 500, such as by clicking on the name of the selected target virtual volume. The end user terminal 500 sends the target virtual volume information including the entered target virtual volume name (virtual volume specifying information) and the host ID of the host 200 which sent the virtual volume display information, to the accessing host 200.

When the host 200 receives the target virtual volume information from the end user terminal 500, the host 200 refers to the virtual volume catalog table 221, and acquires the virtual volume ID, the storage node ID, and the location of the storage node, which are associated with the name of the target virtual volume included in the received target virtual volume information, in the virtual volume catalog table 221. Further, the host 200 transmits the virtual volume access request information including the own host ID, the virtual volume ID and the storage node ID acquired from the virtual volume catalog table 221, and the information of request for access permission, to the storage node 310 at the location acquired from the virtual volume catalog table 221.

When the storage node 310 receives the virtual volume access request information from the host 200 (the target readout device), the storage node 310 executes (A) access setting processing, as described below. In other words, when the storage node 310 receives the host ID (target readout device specifying information capable of specifying the target readout device) and the virtual volume ID of the target virtual volume (target virtual volume specifying information capable of specifying the target virtual volume), the access setting unit 31 executes the access setting processing.

FIG. 15 is a flowchart showing an example of an access setting processing according to the first embodiment. The access setting processing shown in FIG. 15 is executed by the access setting unit 31 (see FIG. 3) of the storage node 310.

The storage node 310 refers to the virtual volume management table 321 to acquire the disclosure restricted data existence information associated with the virtual volume ID of the target virtual volume included in the virtual volume access request information (step S1501). As explained above, the disclosure restricted data existence information indicates whether the virtual volume stores the disclosure restricted data (i.e., disclosure restriction permitted data) which is restricted to disclose to the outside of the disclosure restricted data existence area corresponding to the virtual volume.

Next, based on the disclosure restricted data existence information acquired in step 1501, the storage node 310 determines whether the target virtual volume stores the personal information (the disclosure restriction permitted data in the first embodiment) (step S1502). When the value of disclosure restricted data existence information is "1" (indicating that the virtual volume stores the personal information (the disclosure restriction permitted data)), the storage node 310 determines that the target virtual volume stores the personal information (the disclosure restricted data) (step S1502: Yes), and proceeds to step S1504. Note hat, as explained above, in this embodiment, the personal information that can be stored in the virtual volume is limited to personal information (disclosure restriction permitted data) that can be disclosed in the virtual volume existence area corresponding to the virtual volume.

On the other hand, when the value of the disclosure restricted data existence information is "0" (indicating that the virtual volume does not store the personal information (the disclosure restriction permitted data)), the storage node 310 determines that the target virtual volume does not store the personal information (the disclosure restricted data) (step S1502: No), and proceeds to step S1503. That is, when the storage node 310 determines that the target virtual volume does not store the personal information (the disclosure restriction permitted data) (step 1502: No), the storage node 310 permits the target readout device to read data from the target virtual volume, and in step 1503, the storage node 310 sets the storage node 310 to be able to the target readout device can read data from the target virtual volume.

Next, the storage node 310 transmits the information that "that the target readout device is permitted to read data from the target virtual volume" to the host 200 that has transmitted the virtual volume access request information to the storage node 310, sets the storage node 310 to be able to the target readout device can read data from the target virtual volume, and ends the processing (step 1503).

In step 1504, the storage node 310 acquires the name of the target readout device existence area and the name of the target virtual volume existence area (step 1503). The target readout device existence area is the readout device existence area including the location of the target readout device among the readout device existence area.

Here, the storage node 310 refers to the host existence area management table 322, acquires the host existence area name associated with the host ID included in the virtual volume access request information, in the host existence area management table 322, and sets the acquired name as the name of the target readout device existence area. The storage node 310 refers to the virtual volume existence area management table 323, acquires the name of the virtual volume existence area associated with the Vol ID of the target virtual volume included in the virtual volume access request information, in the virtual volume existence area management table 323, and sets the acquired name as the name of the target virtual volume existence area.

Next, the storage node 310 determines whether the name of the target readout device existence area and the name of the target virtual volume existence area are the same (step S1505). When the storage node 310 determines that the name of the target readout device existence area and the name of the target virtual volume existence area are the same (step S1505: Yes), the target readout device is permitted to present and disclose the personal information (the disclosure restricted data) stored in the target virtual volume, and therefore, the process proceeds to step 1503, in which the target readout device is permitted to read data from the target virtual volume.

On the other hand, when the storage node 310 determines that the name of the target readout device existence area and the name of the target virtual volume existence area are not the same (step S1505: No), the process proceeds to step S1506.

In step 1506, the storage node 310 determines whether the target data readable area includes the target readout device existence area. Here, the storage node 310 refers to the data readable area management table 324, and acquires the name of the data readable area associated with the name of the target virtual volume existence area in the data readable area management table 324. Then, the storage node 310 determines whether the data readable area indicated by the name of the data readable area includes the target readout device existence area indicated by the name of the target readout device existence area. In the case where the storage node 310 determines that the data readable area includes the target readout device existence area (step S1506: Yes), the process proceeds to step S1503, where the target readout device is permitted to read the data from the target virtual volume. This is because the data readable area for the target virtual volume includes the target readout device existence area, and therefore the target readout device on the host 200 is permitted to present and disclose the personal information (the disclosure restricted data) stored in the target virtual volume.

On the other hand, in the case where the storage node 310 determines that the data readable area does not include the target readout device existence area (step 1506: No), the process proceeds to step 1507, where the target readout device is not permitted to read data from the target virtual volume. In this case, the target virtual volume stores the personal information (the disclosure restriction permitted data) (step 1502: Yes), and the target data readable area does not include the location where the target readout device exists (step 1506: No). In order to prevent the personal information (disclosure restriction permitted data) stored in the target virtual volume from being read and disclosed by the host 200 (end user terminal 500) located outside the target data readable area corresponding to the target virtual volume, the storage node 310 does not permit the target readout device to read data from the target virtual volume in step 1507.

Next, the storage node 310 transmits the information that "that the target readout device is not permitted to read data from the target virtual volume" to the host 200 that has transmitted the virtual volume access request information to the storage node 310, and ends the processing (step 1507). When the host 200 receives the information that "that the target readout device is not permitted to read data from the target virtual volume", the host 201 transfers the information to the end user terminal 500. When the end user terminal 500 receives the information that "that the target readout device is not permitted to read data from the target virtual volume", the end user terminal 500 displays, on an output device or the like, the information that "The virtual volume cannot be accessed. Because the personal information (the disclosure restricted data) that cannot be disclosed, is stored in the virtual volume.", thereby presenting to the user of the end user terminal 500 that the data cannot be read from the virtual volume.

Figure 16:
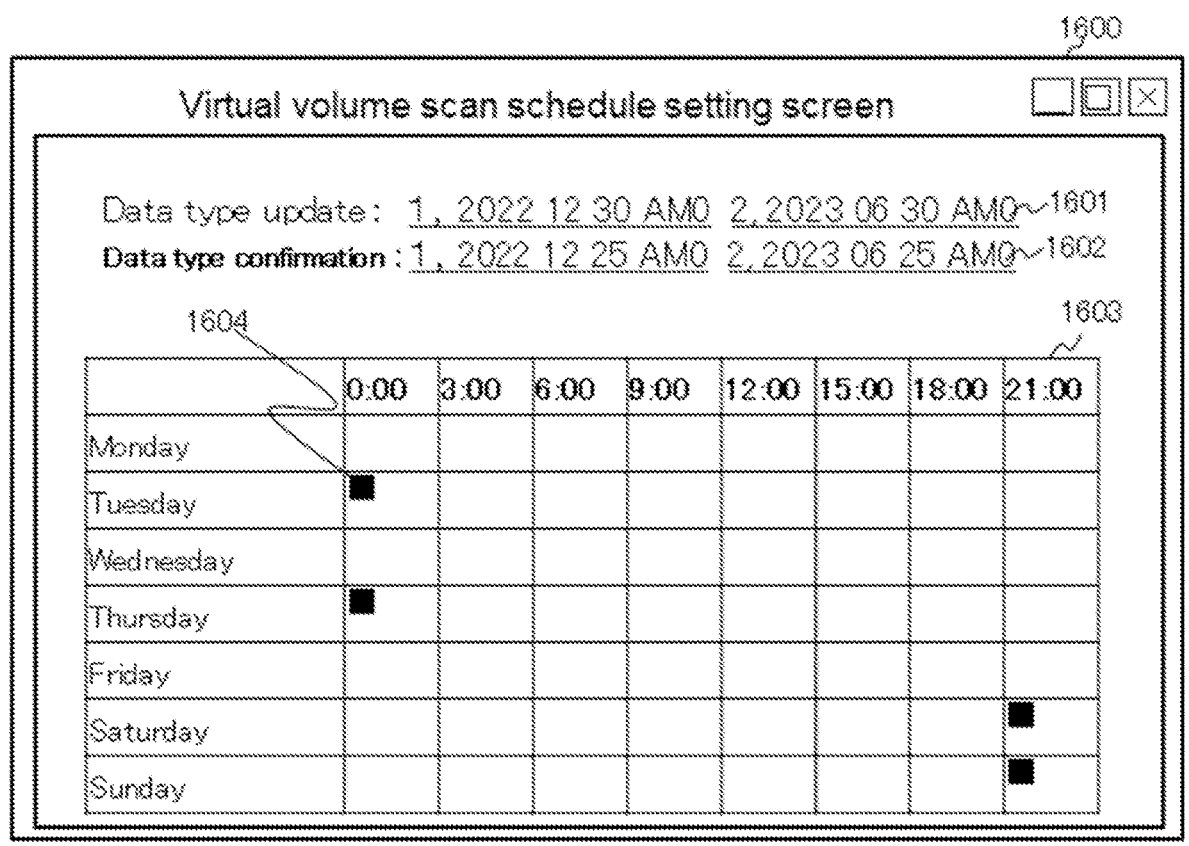
FIG. 16 is an explanatory diagram showing an example of a virtual volume scan schedule setting screen according to the first embodiment.
Figure 17:
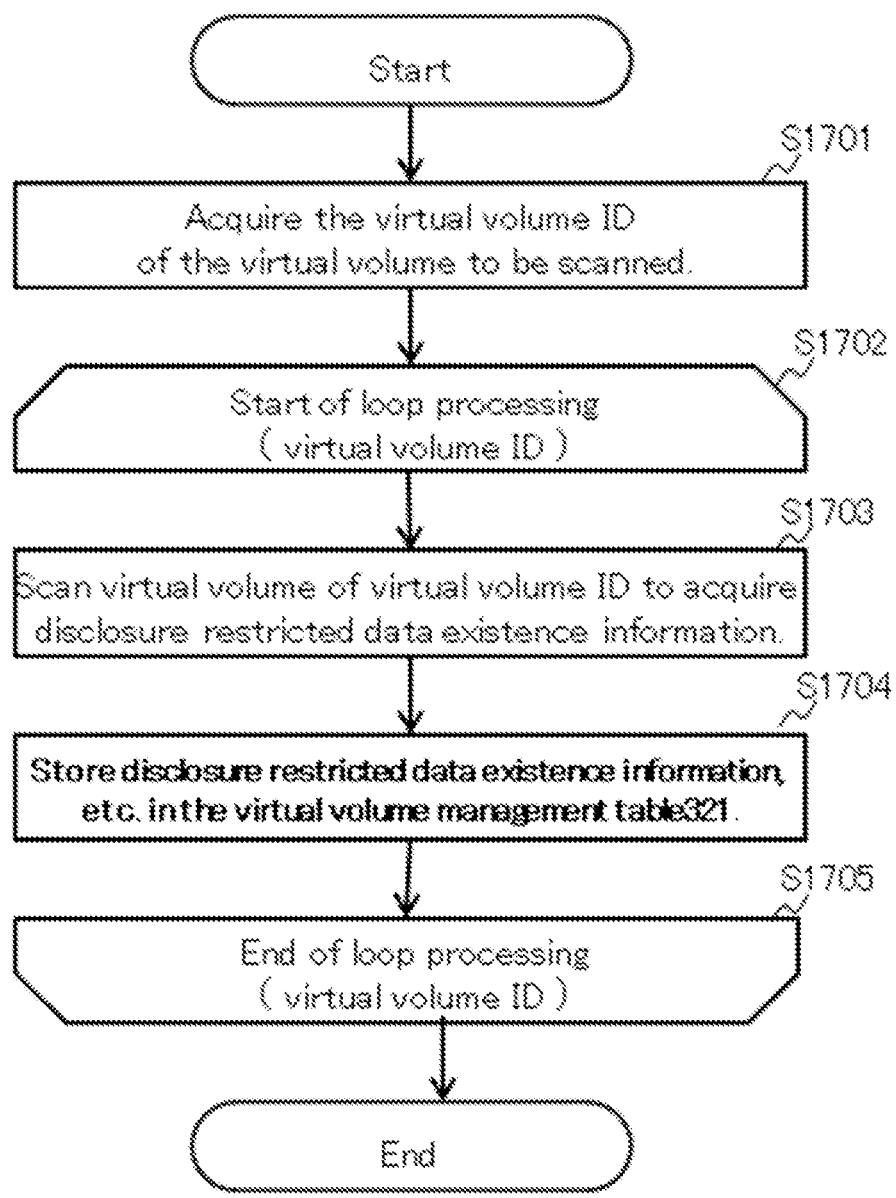
FIG. 17 is a flowchart showing an example of a disclosure restricted data detection processing of the first embodiment.

<(B) Disclosure Restricted Data Detection Processing, FIG. 16, FIG. 17>

In response to an instruction from the host 200, when data is to be written to the virtual volume (including when data is to be written to or changed), the storage node 310 sets the record which is corresponding to the virtual volume to which data is to be written, and which is in the virtual volume management table 321 as follows. in the record, set the value of "disclosure restricted data existence information 703" to "1", sets the value of "scan date and time 704" to "0", and set the values corresponding to all host IDs of "access permission setting status 705 with the host" to "0".

Here, by setting the value of "disclosure restricted data existence information" to "1", the storage node 310 regards the virtual volume in which data is written as including the personal information (the disclosure restriction permitted data). With this setting, in (A) access setting processing described above, the storage node 310 is set so as not to permit reading of data stored in the virtual volume in which data is written from an area other than the data readable area.

By setting the value of the "scan date and time 704" to "0", the storage node 310 sets the virtual volume to which data is written to the virtual volume to be scanned again to determine whether the personal information (the disclosure restriction permitted data) whose disclosure is restricted is stored, in (B) disclosure restricted data detection processing described below.

The date and time when storage node 310 starts scanning can be set by the administrator of storage system 100 using host 200. When a user on host 200 (the administrator of storage system 100) executes data editing program 23 a on host 200, the user on host 200 enters the storage node ID or storage node name (See storage node ID 601 and storage node name 602 in FIG. 6) of the storage node 310 for which the date and time to start scanning is to be set on host 200. The host 200 then accesses the setting device 400. The setting device 400 transmits the virtual volume scan schedule setting screen display instruction, which includes information about the configuration of the virtual volume scan schedule setting screen and a statement to display the virtual volume scan schedule setting screen, to the host 200. When the host 200 receives the virtual volume scan schedule setting screen display instruction, the host 200 reads the scan schedule setting table 327 from the storage node 310 associated with the storage node ID or storage node name entered by the user in the host 200. The virtual volume scan schedule setting screen is then displayed on the output device 215, including the information in the read scan schedule setting table 327.

FIG. 16 is an explanatory diagram showing an example of a virtual volume scan schedule setting screen 1600 displayed on host 200. As shown in FIG. 16, the virtual volume scan schedule setting screen 1600 has a data type update column 1601, a data type confirmation column 1602, and a scan schedule setting table 1603.

The data type update column 1601 is a column for inputting the date and time at which (B) disclosure restricted data detection processing is executed to scan the virtual volume in order to detect, from the virtual volume, the information of newly restricting disclosure which is stored in the disclosure restricted data type management table 325. When a date and time is entered in data type update column 1601, it is automatically marked in black in the cell of the scan schedule setting table 1603 corresponding to the entered date and time. The data type confirmation column 1602 is a column for inputting the date and time for executing (C) disclosure restricted data type acquisition processing described below. By default, the date and time read from the type update schedule setting list 328 for the storage node 310 associated with the storage node ID or storage node name input to the host 200 by the user is displayed.

The scan schedule setting table 1603 is a field for inputting the date and time when disclosure restricted data detection processing (B) described below is executed. The scan schedule setting table 1603 is created based on the information of the scan schedule setting table 327 read from the storage node 310 as described above.

When the user of the host 200 clicks a desired cell in the scan schedule setting table 1603, the black marker 1604 is set to the clicked cell, and the date and time corresponding to the clicked cell is set to the date and time when the disclosure restricted data detection processing (B) is to be executed. When the user clicks the cell of the scan schedule setting table 1603 in which the black marker 1604 is set, the black marker 1604 is erased, and the scheduled date and time for executing (B) disclosure restricted data detection processing corresponding to the black marker 1604 is canceled ((B) disclosure restricted data detection processing is set not to be executed). The date and time at which disclosure restricted data detection processing is executed is set on the virtual volume scan schedule setting screen 1600 using the data type update column 1601 and the scan schedule setting table 1603 in the procedure described above. This set date and time is stored in the scan schedule setting table 327 of the storage node 310 associated with the storage node ID or storage node name input by the user to the host 200. The date and time of executing disclosure restricted data type acquisition processing, input to the data type confirmation column 1602 in the virtual volume scan schedule setting screen 1600, is stored in the type update schedule setting list 328 of the storage node 310 associated with the storage node ID or the storage node name input by the user to the host 200.

FIG. 17 is a flowchart showing an example of a disclosure restricted data detection processing of the embodiment. The disclosure restricted data detection processing shown in FIG. 17 is executed by the disclosure restricted data detection unit 32 (see FIG. 3) of the storage node 310 at the date and time set in the scan schedule setting table 327 (the time at which the value of the time 1302 to 1309 in the scan schedule setting table 327 is "1").

The storage node 310 acquires the virtual volume ID of the virtual volume to be scanned from the virtual volume management table 321 (see FIG. 7) and stores the virtual volume ID (step 1701). In step 1701, the storage node 310 extracts all the records in which the value of "scan date and time" is 0 in the virtual volume management table 321, and stores the Vol IDs (virtual volume IDs) of all the extracted records. As described above, in the virtual volume management table 321, all the records in which the value of the "scan date and time" is 0 are the records of the virtual volume to be scanned again to determine whether the virtual volume include the personal information whose disclosure is restricted, due to the writing of data in the virtual volume or the like.

Next, the storage node 310 starts loop processing for updating the virtual volume management table 321 (see FIG. 7) (step S1702). The processing shown between the loop start step S1702 and the loop end step S1705 is repeated for each virtual volume ID (Vol ID) extracted in step S1701. In step S1702, the storage node 310 selects one virtual volume ID (Vol ID) from the unprocessed virtual volume IDs (Vol IDs).

Next, the storage node 310 scans the virtual volume associated with the virtual volume ID (Vol ID) selected in step S1702, and acquires disclosure restricted data existence information indicating whether at least one of personal information data has been detected (step 1703). Here, the storage node 310 acquires the disclosure restricted data existence information indicating whether at least one of the personal information data has been detected by scanning the virtual volume so as to detect disclosure restricted data. The disclosure restricted data to be detected here is data (disclosure restricted data) of personal information whose type is the type 1102 of disclosure restricted data type management table 325 associated with the value of a date and time of the implementation start timing 1104 which is older than the date and time when the storage node 310 started execution of the disclosure restricted data detection processing. When the storage node 310 detects at least one of the personal information data, the storage node 310 stores "1" (indicating that the virtual volume stores the personal information (the disclosure restriction permitted data)) to the value of the disclosure restricted data existence information 703. On the other hand, when the storage node 310 does not detect the data of personal information, the storage node 310 stores "0" (indicating that the virtual volume does not store the personal information (the disclosure restriction permitted data)) to the value of the disclosure restricted data existence information 703.

Next, the storage node 310 stores the value (0 or 1) of the disclosure restricted data existence information 703 acquired in step 1703, the information of the date and time when the storage node 310 started the disclosure restricted data detection processing corresponding to the scan date and time 704, and the virtual volume ID of the scanned virtual volume in the record which is associated with the virtual volume ID (Vol ID) selected in step 2602 and which is stored in the virtual volume management table 321 (see FIG. 7) (step 1704). Here, storage node 310 has updated the data in the virtual volume management table 321 by storing information about the date and time when storage node 310 started executing disclosure restricted data detection processing corresponding to the scan date and time 704.

Further, the following processes A and B are executed by steps S1703 and S 1704.

Process A; The disclosure restricted data detection unit 32 scans the virtual volume and stores, in association with each other, the disclosure restricted data existence information indicating that the virtual volume stores disclosure restricted data ("1"), and the virtual volume ID of the scanned virtual volume, in the virtual volume management table (the virtual volume management information) 321, when at least one data whose type is the type of the disclosure restricted data which is restricted to disclose and which is associated with a name of the disclosure restricted data existence area corresponding to the scanned virtual volume in the disclosure restricted data type management table (the disclosure restricted data type management information) 325 is detected from the scanned virtual volume.

Process B; The disclosure restricted data detection unit 32 scans the virtual volume and stores, in association with each other, the disclosure restricted data existence information indicating that the virtual volume does not store disclosure restricted data ("0"), and the virtual volume ID of the scanned virtual volume, in the virtual volume management table (the virtual volume management information) 321, when the data whose type is the type of the disclosure restricted data which is restricted to disclose and which is associated with a name of the disclosure restricted data existence area corresponding to the scanned virtual volume in the disclosure restricted data type management table (the disclosure restricted data type management information) 325 is not detected from the scanned virtual volume.

Next, the storage node 310 judges whether the processing has been completed for all the virtual volume IDs (Vol IDs) stored in step 1701 (step 1705). If the storage node 310 judges that the processing has not been completed for all the virtual volume IDs (Vol IDs) stored in step 1701, the storage node 310 returns to step 1702 and continues the processing. On the other hand, if the storage node 310 judges that the processing has been completed for all the virtual volume IDs (Vol IDs) stored in step 1701, the storage node 310 ends the processing.

As in the data sharing system 2 of the second embodiment described below, in the data sharing system 1 of the first embodiment may add the configurations, so that only a limited number of virtual volumes among the virtual volumes created in the storage node 310 can be accessed from the end user terminal 500 which may be authenticated by an ID, a password, or the like. In this case, the following configurations 1 to 4 may be added to the data sharing system 1

Configuration 1; The scan schedule setting table 327B (including information on the ID of the user group) is created for each user or for each group (organization or company) of persons who share the ID and password used for authentication, and is stored in each storage node 310. Hereinafter, the users and groups are collectively referred to as a user group, and the user group may be composed of one member.

Configuration 2: Each of the storage nodes 310 stores the user group use virtual volume information that includes in association with each other, the information of the ID of the user group of the scan schedule setting table 327B, the ID of the user group, and the virtual volume ID list of at least one virtual volume permitted to be accessed by the user group.

Configuration 3: The storage node 310 refers to all of the scan schedule setting tables 327 and performs (B) disclosure restricted data detection processing according to the schedule stored in all of the scan schedule setting tables 327. Here, the storage node 310 acquires the virtual volume ID list associated with the information of the ID of the user group of the scan schedule setting table 327B in the user group use virtual volume information at the time when the execution of (B) disclosure restricted data detection processing is set in the scan schedule setting table 327B. Then, the storage node 310 acquires the virtual volume ID from the record in which the value of the scan date and time 704 is "0" among the records in the virtual volume management table 321 in which the virtual volume ID included in the acquired virtual volume ID list is stored. The storage node 310 executes the scan processing of step S1703 of the flowchart of FIG. 17 of (B) disclosure restricted data detection processing on the virtual volume (virtual volume that needs to be scanned) associated with the acquired virtual volume ID, and stores the result of the scan in the virtual volume management table 321 in the processing of step S1704.

Configuration 4: The virtual volume scan schedule setting screen described above with reference to FIG. 16 allows a user group to be selected (e.g., a list of user group names is displayed, and the user group name can be selected by clicking on it), and causes the virtual volume scan schedule setting screen to display a scan schedule setting table 1603B, etc. for the selected user group. After the user of the host 200 (the administrator of the storage system 100) sets a schedule for executing (B) disclosure restricted data detection processing by using the scan schedule setting table 1603B or the like, the scan schedule setting table 1603B overwrites the scan schedule setting table 327B, and the set schedule is reflected in the scan schedule setting table 327B.

Figure 18:
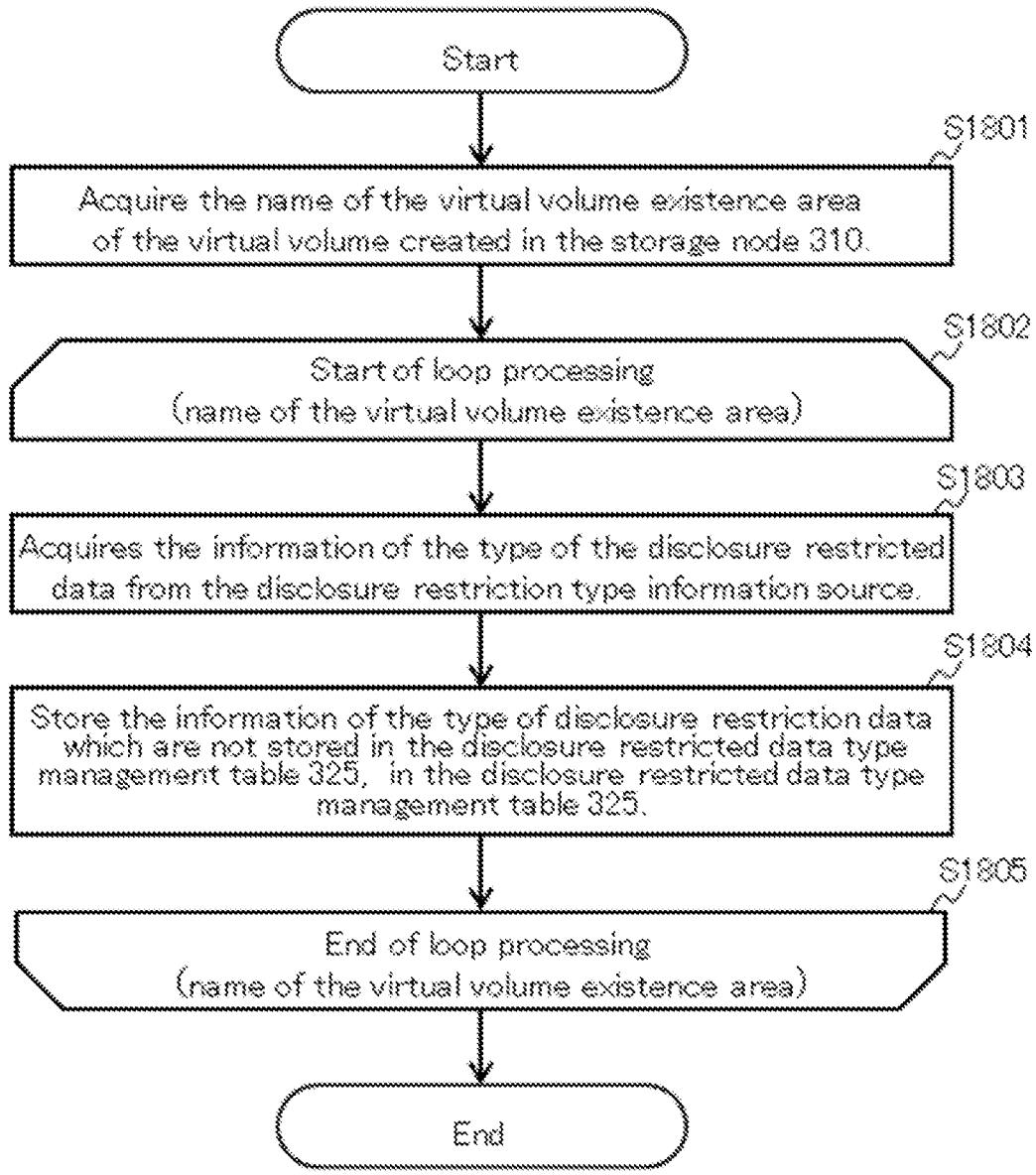
FIG. 18 is a flowchart showing an example of a disclosure restricted data type acquisition processing of the first embodiment.

<(C) Disclosure Restricted Data Type Acquisition Processing, FIG. 18>

FIG. 18 is a flowchart showing an example of a disclosure restricted data type acquisition processing of the embodiment. The disclosure restricted data type acquisition processing shown in FIG. 18 is executed by the disclosure restricted data type acquisition unit 22 (see FIG. 1) of the storage node 310. The disclosure restricted data type acquisition processing is executed at the date and time set using the virtual volume scan schedule setting screen (see FIG. 16) and stored in the type update schedule setting list 328.

The storage node 310 acquires and stores the name of the virtual volume existence area of the virtual volume created in the storage node 310 from the virtual volume existence area management table 323 (see FIG. 9) (step S1801). The name of the virtual volume existence area stored in the virtual volume existence area management table 323 (see FIG. 9) is the name of the area (virtual volume existence area) in which the virtual volume created in the storage node 310 exists. In step 1801, the storage node 310 acquires the names of all the virtual volume existence areas stored in the virtual volume existence area management table 323 (see FIG. 9), and stores a list of the names of the virtual volume existence areas created by deleting the duplicate names of the virtual volume existence areas from the acquired names of the virtual volume existence areas. The list of the names of the virtual volume existence areas is a list of the names of the virtual volume existence areas in which the virtual volume created in the storage node 310 exists.

Next, the storage node 310 starts a loop process for updating the disclosure restriction information source management table 326 (see FIG. 12) (step 1802). The processing shown between step S1802 of the loop start and step S1805 of the loop end are repeated for each name of the virtual volume existence area stored in step S1801. In step S1802, the storage node 310 selects the name of one virtual volume existence area from the names of the unprocessed virtual volume existence areas.

Next, the storage node 310 refers to the disclosure restriction information source management table 326 (see FIG. 12), and acquires the information of the type of the personal information (the disclosure restricted data) from the disclosure restriction type information source 1202 of the record (hereinafter referred to as the target record) associated with the name of the virtual volume existence area selected in Step 1802 in the disclosure restriction information source management table 326 (Step 1803). That is, in step 1803, the storage node 310 accesses the site of the IP address that is the value of the disclosure restriction type information source 1202 of the record associated with the name of the virtual volume existence area selected in step 1802, acquires the information that can be acquired, extracts information related to the restriction of disclosure of the personal information (the disclosure restricted data) from the acquired information, and stores the information as information of the type of the personal information (the disclosure restricted data). For example, the value of disclosure restriction type information source 1202 is the IP address or URL of a site that publishes the laws and regulations of a country's government. Then, storage node 310 acquires and stores obtainable information (Text files, PDF files, etc.) from the IP address or URL of the value of disclosure restriction type information source 1202. Further, the storage node 310 extracts information relating to restriction of disclosure of the personal information (the disclosure restricted data) (for example, a text or a PDF file in which includes characters "personal information") from the stored information, and stores the information as information of type of the personal information (the disclosure restricted data).

Next, the storage node 310 calculates a difference between the information of the type of the personal information (the disclosure restricted data) acquired in the step 1803 and the information of the type 1102 of the disclosure restricted data of the target record of the disclosure restricted data type management table 325 (see FIG. 11) by using an existing text mining method or the like, and stores the difference in the target record (step 1804). Here, the difference is information of the type of the disclosure restricted data, which is included in the information of the type of the acquired personal information (the disclosure restricted data) but is not stored in the type 1102 of the target record of the disclosure restricted data type management table 325 (see FIG. 11). Further, the storage node 310 extracts the scheduled date for changing the access restriction range of the disclosure of the personal information and the information of the type of the personal information to be changed, which are included in the information of the type of the personal information (the disclosure restricted data) of the difference calculated in the step 1804 and are associated with the information of the type of the personal information (disclosure restricted data) of the difference, using an existing text mining method or the like. Further, the storage node 310 stores, in the target record of the disclosure restricted data type management table 325 (see FIG. 11), the extracted scheduled date for changing the access restriction range of the disclosure of the personal information and the extracted information of the type of the personal information to be change. In this wat, the storage node 310 updates the disclosure restricted data type management table 325 (see FIG. 11).

For example, the storage node 310 extracts, from the information stored in the step 1804, a page in which characters indicating a revision of the law, such as "not yet enforced", "enforced on Apr. 1, 2023", and "comparison between old and new", are described. Furthermore, the storage node 310 extracts, from the extracted page, information of a scheduled date for implementing a legal amendment such as "effective on Apr. 1, 2023" (i.e., a scheduled date for changing the access restriction range of disclosure of personal information) and a word representing the type of data of personal information to be newly restricted such as "photo" and "address" (i.e., information of the type of personal information to be changed) by using an existing text mining technique or the like. Furthermore, the storage node 310 stores the extracted information in the disclosure restricted data type management table 325 (see FIG. 11).

Note that, the storage node 310 executes (B) disclosure restricted data detection processing according to the scheduled date for changing the access restriction range of disclosure of personal information (information of the scheduled date for implementing the legal amendment) stored in the disclosure restricted data type management table 325. As a result, it is possible to change the type of personal information that is restricted to be disclosed as scheduled.

Note that, in the case where the difference between the type information of the disclosure restricted data acquired in step 1803 and the type information of the disclosure restricted data in the target record of the disclosure restriction information source management table 326 (see FIG. 11), describes the information of the change of the data readable area, then the information of the change of the data readable area (a record including the values of the virtual volume existence name 1101, the type 1102, the data readable area name 1103, and the implementation start timing 1104) is stored in the disclosure restricted data type management table 325.

Next, the storage node 310 determines whether processing has been completed for the names of all the disclosure restricted data existence areas stored in step S1801 (step S1805). s If the storage node 310 determines that processing has not been completed for the names of all the disclosure restricted data existence areas stored in step S1801, the storage node 310 returns to step S1802 and continues processing. On the other hand, when the storage node 310 determines that the processing is complete for the names of all the disclosure restricted data existence areas stored in step S1801, the storage node 310 ends the processing.

Effects of the Invention

As described above, in the first embodiment, the data sharing system 1 restricts the reading of data from the target virtual volume by the host 200 (target readout device) in accordance with the information on the location (name of the host existence area) where the host 200 (target readout device) accessing the data sharing system exists and the information on the location (name of the virtual volume existence area) of the target virtual volume. As a result, it is possible to prevent the host 200 (target readout device) located in a place where disclosure of the data stored in the target virtual volume is prohibited, from reading the data stored in the target virtual volume and disclosing the data stored in the target virtual volume. Therefore, data sharing system 1 make it easy to suppress the disclosure of data whose disclosure is restricted according to the location where the data exists, in accordance with the provision of the disclosure restriction.

As described above, by restricting disclosure of personal information that is permitted to be disclosed in the disclosure restricted data existence area, the data sharing system 1 can quickly share data around the world in compliance with the privacy protection laws and regulations of countries around the world, thereby preventing business suspension and credit deterioration due to leakage of personal information. The data sharing system 1 also facilitates restricting disclosure of personal information that is permitted to be disclosed in the disclosure restricted data existence area.

In addition, the data sharing system 1 does not permit the host 200 (target readout device) to read data from the target virtual volume when the data readable area for the target virtual volume does not include the location where the host 200 (target readout device) exists. The data sharing system 1 permits the host 200 (target readout device) to read data from the target virtual volume, at least the two cases; one case is the case where the target virtual volume does not store disclosure restricted data, and another case is the case where the data readable area for the target virtual volume includes the location where the host 200 (target readout device) exists. Thus, data sharing system 1 can permit host 200 (target readout device) to read data from the target virtual volume when appropriate.

The data sharing system 1 can scan the virtual volume to detect the disclosure restricted data, and restrict the reading of the host 200 (target readout device) data from the virtual volume from which the disclosure restricted data has been detected, in accordance with the location of the host 200 (target readout device) from which the virtual volume from which the disclosure restricted data has been detected is to be read. By scanning in this manner, the data sharing system 1 facilitates restricting the reading of data by the host 200 (target readout device) from the virtual volume from which the disclosure restricted data has been detected, in accordance with the location of the host 200 (target readout device) that is to read the virtual volume from which the disclosure restricted data has been detected.

Further, data sharing system 1 sets the storage node to be able to the host 200 (target readout device) can read data from the target virtual volume, in the case where data sharing system 1 permit the host 200 (target readout device) to read data from the target virtual volume. On the other hand, data sharing system 1 sets the storage node to be able to the host 200 (target readout device) cannot read data from the target virtual volume, in the case where data sharing system 1 does not permit the host 200 (target readout device) to read data from the target virtual volume. Thus, the data sharing system 1 can appropriately restrict the host 200 (target readout device) from reading data from the target virtual volume.

Further, the data sharing system 1 acquires the information of the type of disclosure restricted data from the disclosure restriction type information source, and additionally stores the information which is not stored in the disclosure restricted data type management table 325 (see FIG. 11, disclosure restricted data type management information) among the acquired information of the type of disclosure restricted data in the disclosure restricted data type management table 325 (disclosure restricted data type management information). Thus, the data sharing system 1 can update the disclosure restricted data type management table 325 (disclosure restricted data type management information). The data sharing system 1 then scans the virtual volume based on the disclosure restricted data type management table 325 (disclosure restricted data type management information), which can be updated in this manner, and detects the disclosure restricted data from the virtual volume. Thus, the data sharing system 1 can restrict the disclosure of the disclosure restricted data according to the change of the type of the disclosure restricted data.

Further, the storage node 310 in which the virtual volume is created is provided in a plurality of disclosure restricted data existence areas (countries, etc.). Thus, the data sharing system 1 can store the disclosure restricted data whose disclosure is restricted to the disclosure restricted data existence area (country, etc.) in the virtual volume not only in one disclosure restricted data existence area (country, etc.) but also in a plurality of disclosure restricted data existence areas (countries, etc.).

The data sharing system 1 includes, as the storage node 310, a storage node 310 of the cloud environment and a storage node 310 of the on-premises environment. This allows a user to create virtual storage for storing disclosure restricted data in either the cloud environment storage node 310 or the on-premises environment storage node 310, taking into account the advantages of the cloud environment and the on-premises environment.

Modification 1

In the data sharing system 1 according to the first embodiment, the end user terminal 500 that has accessed the host 200 displays the name of the virtual volume from which the host 200 cannot permit data reading. In the data sharing system 1 of the modification 1, as described below, the end user terminal 500 is prevented from displaying the name of the virtual volume from which the host 200 cannot permit data reading.

Based on the output obtained by executing (B) disclosure restricted data detection processing and (A) access setting processing, each of the storage nodes 310 transmits to each of the host 200, the information of the virtual volume from which the reading of the data of the host 200 is permitted, as explained below.

The storage node 310 acquires the data readable area associated with the virtual volume existence area including its own location from the disclosure restricted data type management table 325 (see FIG. 11).

Then, the storage node 310 generates first storage node virtual volume catalog information storing, in association with each other, all of the virtual volume IDs and the names of the virtual volumes created in the storage node 310, the ID of its own storage node 310, the name of its own storage node 310, and its own location, and transmits the first storage node virtual volume catalog information to each of the hosts 200 present in the data readable area. Here, the first storage node virtual volume catalog information is the information that constitutes the virtual volume catalog table 221 (See FIG. 6) stored by host 200 in the data readable area.

Further, the storage node 310 acquires the information including, in association with each other, the virtual volume ID of the virtual volume that does not store the personal information (the disclosure restriction permitted data) and the name of the virtual volume. That is, the storage node 310 stores, in association with each other, the virtual volume ID and the name of the virtual volume, of the record in which the value of the disclosure restricted data existence information 703 is "0" in the virtual volume management table 321 (see FIG. 7). Then, the storage node 310 generates second storage node virtual volume catalog information including in association with each other, the stored virtual volume ID and the stored name of the virtual volume storing the personal information (the disclosure restriction permitted data), the name of its own storage node 310, and its own location, and transmits the second storage node virtual volume catalog information to each host 200 existing in an area other than the data readable area. The second storage node virtual volume catalog information is information constituting the virtual volume catalog table 221 (see FIG. 6) stored by the host 200 existing outside the data readable area. The processing of the storage node 310 has been described above.

Next, the host 200 generates a virtual volume catalog table 221 (see FIG. 6) from the first storage node virtual volume catalog information and the second storage node virtual volume catalog information obtained from each of the respective storage nodes 310. The virtual volume catalog table 221 (see FIG. 6) generated in this manner contains the information of the virtual volume from which the reading of the data of the host 200 is permitted.

The host 200 transmits the virtual volume display information containing the name of the virtual volume extracted from the virtual volume catalog table 221 (see FIG. 6) to the end user terminal 500 as described above. Then, the end user terminal 500 displays the name of the virtual volume from which data reading is permitted from the host 200 (target readout device), and the user selects the name of the target virtual volume from which data is to be read. Then, as described above, the host 200 transmits to the storage node 310, the virtual volume access request information including the virtual volume ID, the storage node ID, and the request for access permission, which are associated with the name of the selected virtual volume, to the storage node 310 at the location acquired from the virtual volume catalog table 221. The storage node 310 sets the storage node to be able to the host 200 (target readout device) can read data from the target virtual volume, based on the virtual volume access request information.

As described above, in the data sharing system 1 according to the modification 1, the end user terminal 500 cannot acquire the information of the virtual volume including the disclosure restriction permitted data such as the personal information that is both inhibited from being disclosed to the end user terminal 500 and permitted to be disclosed in the area (country, etc.) where the personal information exists. Thus, the data sharing system 1 of modification 1 can further conceal the disclosure restriction permitted data.

Modification 2

In the data sharing system 1 of the modification 2, the host 200 has a disclosure restricted data type acquisition unit 33 and executes (C) disclosure restricted data type acquisition processing. The host 200 stores the disclosure restricted data type acquisition program 33a, the disclosure restricted data type management table 325, and the disclosure restriction information source management table 326 in the sub-memory device 213. After executing (C) disclosure restricted data type acquisition processing (FIG. 18), the host 200 transmits the updated disclosure restricted data type management table 325 to all the storage nodes 310 in the disclosure restricted data existence area including the location of the host 200. The storage node 310 updates the disclosure restricted data type management table 325 to the disclosure restricted data type management table 325 received from the host 200.

As described above, in the data sharing system 1 of the modification 2, the host 200, which is smaller in number than the storage node 310, executes (C) disclosure restricted data type acquisition processing. Therefore, disclosure restricted data type acquisition processing can be performed efficiently in terms of that disclosure restricted data type acquisition processing is performed with a smaller number of devices.

Note that, instead of the host 200, the setting device may have a disclosure restricted data type acquisition unit 33, execute (C) disclosure restricted data type acquisition processing, and transmit the updated disclosure restricted data type management table 325 to all the storage nodes 310.

Second Embodiment

FIG. 19 is an explanatory diagram of the data sharing system 2 according to the second embodiment. In the data sharing system 2 of the second embodiment, the end user terminal 500 can access the host 200 existing in an area other than the area (for example, country C) in which the end user terminal 500 exists. When the target virtual volume to be read by the end user terminal 500 is a virtual volume for which data reading cannot be permitted, the storage node 310 does not permit the end user terminal 500 and the host 200 to read the data stored in the target virtual volume. On the other hand, when the target virtual volume is a virtual volume that can permit data reading, the storage node 310 permits the end user terminal 500 and the host 200 to read data stored in the target virtual volume, and sets the storage node 310 to be able to the user terminal 500 can read data from the target virtual volume.

FIG. 19 shows an example in which the end user terminal 500 located in country C accesses the host 200 located in country A and attempts to read data from the virtual volume VolB created in the storage node 310B located in country B via the host 200 located in country A. Further, in the data sharing system 2 according to the second embodiment, disclosure restricted data other than disclosure restriction permitted data can be stored in the virtual volume as explained below.

<Configuration of Data Sharing System 2>

The data sharing system 2 of the second embodiment has the similar configuration as that of the data sharing system 1 of the first embodiment. The storage node 310 of the data sharing system 2 stores a virtual volume management table 321, a host existence area management table 322, a virtual volume existence area management table 323, a data readable area management table 324, a disclosure restricted data type management table 325, a disclosure restriction information source management table 326, and a scan schedule setting table 327 in a sub-memory device 313.

In addition, in the storage node 310 of the data sharing system 2, the disclosure permitted document 331 and the virtual volume disclosure range information 332 are stored in the virtual volume created in the storage node 310 in this embodiment. FIG. 19 shows that the disclosure permitted document 331 and the virtual volume disclosure range information 332 are stored in the virtual volume VolB created in the storage node 310B in the country B.

The disclosure permitted document 331 stores information created by the person who can be identified by each disclosure restricted data (personal information, etc.) stored in the virtual volume storing the disclosure permitted document 331 (the person himself/herself or a manager of the disclosure restricted data (personal information, etc.)). The disclosure permitted document 331 is a document containing the information including, in association with each other, the information specifying disclosure restricted data stored in the virtual volume, information of permitting disclosure of disclosure restricted data stored in the virtual volume, and the disclosure range information of disclosure restricted data (personal information, etc.).

The virtual volume disclosure range information 332 is a document containing information on the disclosure range of a virtual volume as authorized by the organization administering the virtual volume. One or more of the disclosure permitted document 331 and the virtual volume disclosure range information 332 may be created for one virtual volume, that is, one virtual volume may store a plurality of disclosure permitted documents 331, and one virtual volume may store a plurality of virtual volume disclosure range information 332.

For example, an agreement containing personal information, including the disclosure range of personal information and the signature of the disclosure agreement, prepared by the principal in the virtual volume, may be considered a disclosure permitted document 331. A plurality of disclosure permitted documents 331 may be stored for one document created in the virtual volume. A plurality of disclosure permitted documents 331 may be stored for one document created in the virtual volume. A plurality of disclosure permitted documents 331 may be stored for a plurality of documents created in the virtual volume.

<Processing of Storage Node 310>

The storage node 310 executes (B) disclosure restricted data detection processing (FIG. 17) including the following processing. That is, the storage node 310 scans the virtual volume in advance and acquires the name of the disclosure range of the virtual volume (one of "the name of the organization that created the virtual volume", "the name of the virtual volume existence area", "the name of the data readable area", and "the entire world"). Then, the storage node 310 creates and stores a virtual volume disclosure range table 329 storing, in association with each other, the name of the disclosure range of the acquired virtual volume, the virtual volume ID, the name of the virtual volume, the name of the virtual volume existence area, its own storage node ID, the name of the own storage node, and the location of the own storage node 310.

FIG. 20 is a diagram showing an example of a virtual volume disclosure range table 329. The virtual volume disclosure range table 329 has, as fields, a virtual volume existence name ID 2001, a name 2002 of the disclosure range of the virtual volume, a storage node ID 2003 in which the virtual volume is created, a storage node name 2004 in which the virtual volume is created, a location 2005 of the storage node 310 in which the virtual volume is created, and a catalog 2006 of the virtual volume that is permitted to be read by the host 200. Since the contents of these fields are the same as those of the virtual volume catalog table 221 and the like, the description thereof is omitted.

Here, when the storage node 310 scans the virtual volume in advance, the storage node 310 stores the information relating to the virtual volume in the virtual volume disclosure range table 329 together with the information of the following (condition 1) and (condition 2).

(Condition 1): When at least one of the disclosure restricted data (personal information, etc.) detected from the virtual volume by scanning the virtual volume, cannot be associated with the information of disclosure restricted data (personal information, etc.) stored in the virtual volume in the disclosure permitted document 331, the storage node 310 stores the name of the disclosure range corresponding to the virtual volume being scanned as the "name of the organization that created the virtual volume" in the virtual volume disclosure range table 329. Note that, A case where the disclosure permitted document 331 is not stored in the virtual volume is also included in this (condition 1). That is, when the name of the disclosure range for the virtual volume for which the disclosure permitted document 331 is not stored, the "name of the organization that created the virtual volume" is stored in the virtual volume disclosure range table 329 as the name of the disclosure range for the virtual volume.

This can prevent disclosure of disclosure restricted data that is not permitted to be disclosed. In addition, when the number of types of disclosure restricted data (personal information, etc.) that are prohibited from disclosure (see type 1102 in the disclosure restricted data type management table 325 in FIG. 11) increases due to revision of laws and regulations, disclosure of disclosure restricted data (personal information, etc.) can be suppressed according to the data of the increased types by the condition 1.

(Condition 2): The storage node 310 stores the name of the narrowest disclosure range in the disclosure range information of the disclosure restricted data of the disclosure permitted document 331 stored in the virtual volume being scanned, in the virtual volume disclosure range table 329 as the "name of the disclosure range" for the virtual volume being scanned. Note that, The order of the size of the disclosure range is: "the organization that created the virtual volume"<"virtual volume existence area"<"data readable area"<"the entire world".

This restricts the disclosure range of the data stored in the virtual volume to the narrowest disclosure range among the disclosure range of the disclosure restricted data in the disclosure permitted document 331. As a result, it is possible to prevent disclosure of disclosure restricted data, which is permitted to be disclosed in the narrowest range, from being disclosed in the unauthorized range. In addition, as long as the disclosure permitted document 331 indicates that disclosure is permitted only to the "organization that created the virtual volume," the scope of disclosure of data stored in the virtual volume can be limited to only the "organization that created the virtual volume" without creating the virtual volume disclosure range table 329.

<Reading Data Stored in Virtual Volume by the End User Terminal 500>

When the end user terminal 500 accesses and authenticates the host 200, the end user terminal 500 transmits the own IP address and the own user ID (e.g., the user's ID or the ID of the end user terminal 500) to the host 200. Hereinafter, the end user terminal 500 that accesses the host 200 is referred to as a target readout device. The host 200 stores an organization name table (Figure omitted) in which user IDs and organization names to which the users belong are associated with each other.

The host 200 specifies an area in which the end user terminal 500 exists from the IP address of the end user terminal 500, and sets the specified area as a target readout device existence area. As described above, the target readout device existence area is the readout device existence area for the readout device. In other words, the target readout device existence area is a readout device existence area including the position of the target readout device among the readout device existence area. Referring to the organization name table, the host 200 acquires the organization name to which the user of the end user terminal 500 (target readout device) belongs, which is associated with the user ID transmitted from the end user terminal 500 (target readout device) in the organization name table.

Further, as in the first embodiment described above, when the host 200 receives the information of the name of the target virtual volume from which the end user terminal 500 is to read data, the host 200 transmits second virtual volume access request information including the name of the organization to which the user of the end user terminal 500 belongs, the name of the target readout device existence area, and the virtual volume ID of the target virtual volume, to the storage node 310 in which the target volume is created.

Upon receiving the second virtual volume access request information, the storage node 310 executes (A) access setting processing of Embodiment 2 in the access setting unit 31.

(A) In the access setting processing according to the second embodiment, the storage node 310 determines whether the end user terminal 500 (readout device) can be permitted to read data from the target virtual volume based on the organization name to which the user of the end user terminal 500 belongs, the name of the target readout device existence area, and the virtual volume ID of the target virtual volume, which are included in the second virtual volume access request information, as follows. In the case where the storage node 310 determines that the end user terminal 500 can be permitted to read data from the target virtual volume, the storage node 310 sets the storage node to be able to the host 200 accessed by the end user terminal 500 can read the data from the target virtual volume. On the other hand, in the case where the storage node 310 determines that the end user terminal 500 cannot be permitted to read data from the target virtual volume, the storage node 310 sets the storage node to be able to the host 200 accessed by the end user terminal 500 cannot read the data from the target virtual volume.

The storage node 310 determines whether the reading of data from the target virtual volume can be permitted as follows. The storage node 310 references the virtual volume disclosure range table 329, and acquires the value of the name 2002 of the disclosure range associated with the virtual volume ID of the target virtual volume included in the second virtual volume access request information. The value of the name 2002 of the disclosure range is "the entire world", "name of data readable area", "name of virtual volume existence area" or "name of the organization that created the virtual volume". The storage node 310 determines according to the value of the name 2002 in the disclosure range as follows (1)-(4).

(1) A case where the value of disclosure range is "the entire world". In this case, the storage node 310 determines that the reading of data from the target virtual volume can be permitted.

(2) A case where the value of disclosure range is "the name of the data readable area".

In this case, the storage node 310 uses the name of the target readout device existence area included in the second virtual volume access request information to determine in the same manner as (A) access setting processing of the first embodiment.

That is, in the case where the target data readable area indicated by the name of the data readable area includes the target readout device existence area, the storage node 310 determines that the reading of data from the target virtual volume can be permitted. On the other hand, in the case where the target data readable area indicated by the name of the data readable area does not include the target readout device existence area, the storage node 310 determines that the reading of data from the target virtual volume cannot be permitted.

(3) A case where the value of disclosure range is "the name of the virtual volume existence area". In this case, when the target readout device existence area indicated by the name of the target readout device existence area included in the second virtual volume access request information and the virtual volume existence area are the same, the storage node 310 determines that the reading of data from the target virtual volume can be permitted. On the other hand, when the target readout device existence area indicated by the name of the target readout device existence area included in the second virtual volume access request information and the virtual volume existence area are not the same, the storage node 310 determines that the reading of data from the target virtual volume cannot be permitted.

(4) A case where the value of disclosure range is "name of the organization that created the virtual volume". In this case, when the organization name to which the user of the end user terminal 500 belongs in the second virtual volume access request information is the same as the name of the organization that manages the virtual volume, the storage node 310 determines that the reading of data from the target virtual volume can be permitted. On the other hand, when the organization name to which the user of the end user terminal 500 belongs in the second virtual volume access request information is not the same as the name of the organization that manages the virtual volume, the storage node 310 determines that the reading of data from the target virtual volume cannot be permitted.

As described above, in the data sharing system 2 according to the second embodiment, data in which four kinds of disclosure ranges ("organization managing the virtual volume", "virtual volume existence area", "data readable area", and "the entire world") are set is stored in the virtual volume. The data sharing system 2 can restrict disclosure of the data stored in the virtual volume as necessary. Note that, the personal information that the person who can be identified by personal information has consented to disclosure only within the organization that created the virtual volume, can save in a virtual volume whose disclosure range is "organization that manages the virtual volume".

What is claimed is:

1. A data sharing system comprising a storage node having virtual volumes accessed by a readout device, the data sharing system comprising:
    the storage node that comprises:
        an access setting unit configured to restrict a target readout device from reading data from a target virtual volume in accordance with information on a location of the target readout device accessing the data sharing system and information on a location of the target virtual volume from which the target readout device attempts to read the data; and
        a memory unit,
    wherein the memory unit is configured to store data readable area management information that stores, in association with each other, a name of a disclosure restricted data existence area in which the virtual volume exists, and a name of a data readable area permitted to disclose disclosure restricted data which is stored in the virtual volume and which is restricted to disclose to an outside of the disclosure restricted data existence area corresponding to the virtual volume storing the disclosure restricted data, and
    wherein the access setting unit, when the target readout device specifying information which can specify the target readout device, and the target virtual volume specifying information which can specify the target virtual volume, are input:

does not permit the target readout device to read data from the target virtual volume, in a case where the target virtual volume stores the disclosure restricted data, and in the data readable area management information, the target data readable area indicated by the name of the data readable area associated with the name of the disclosure restricted data existence area in which the target virtual volume exists, does not include an position where the target readout device exists; and permit the target readout device to read data from the target virtual volume, at least in two case, the case where the target virtual volume does not stores the disclosure restricted data, and the case where the target virtual volume stores the disclosure restricted data, and in the data readable area management information, the data readable area indicated by the name of the data readable area associated with the name of the disclosure restricted data existence area in which the target virtual volume exists, include the position where the target readout device exists.

2. The data sharing system according to claim 1, wherein: the storage node further comprises a disclosure restricted data detection unit;

the memory unit further stores a virtual volume management information that stores, in association with each other, a virtual volume ID for identifying the virtual volume, and a disclosure restricted data existence information indicating whether the virtual volume stores the disclosure restriction permitted data which is restricted to disclose to the outside of the disclosure restricted data existence area corresponding to the virtual volume storing the disclosure restriction permitted data;

the disclosure restricted data detection unit scans the virtual volume to detect disclosure restriction permitted data to obtain the disclosure restricted data existence information, and stores the disclosure restricted data existence information and the virtual volume ID of the scanned virtual volume in association with the virtual volume management information;

the access setting unit, when the target readout device specifying information which can specify the target readout device, and the target virtual volume specifying information which can specify the target virtual volume, are input, acquires the disclosure restricted data existence information associated with a virtual volume ID of the target virtual volume with reference to the virtual volume management information;

determines, based on the obtained disclosure restricted data existence information, whether the target virtual volume stores the disclosure restriction permitted data;

in the case where it is determined that the target virtual volume does not store the disclosure restriction permitted data, permit the target readout device to read data from the target virtual volume;

in the case where it is determined that the target virtual volume store the disclosure restriction permitted data, acquires, in the data readable area management information, the name of the data readable area associated with the name of the disclosure restricted data existence area corresponding to the target virtual volume;

in the case where the target data readable area indicated by the name of the acquired data readable area, includes a position where the target readout device exists, permit the target readout device to read data from the target virtual volume;

in the case where the target data readable area indicated by the name of the acquired data readable area, does not include a position where the target readout device exists, not permit the target readout device to read data from the target virtual volume.

3. The data sharing system according to claim 1, wherein the access setting unit:

sets the storage node such that the target readout device can read data from the target virtual volume, in the case where the access setting unit permit the target readout device to read data from the target virtual volume, and sets the storage node such that the target readout device can not read data from the target virtual volume, in the case where the access setting unit does not permit the target readout device to read data from the target virtual volume.

4. The data sharing system according to claim 2, wherein: the storage node further comprises a disclosure restricted data detection unit;

the memory unit further store disclosure restriction information source management information that stores, in association with each other, the disclosure restricted data existence area and disclosure restriction type information source that discloses the information of the type of disclosure restricted data whose disclosure is restricted in the disclosure restricted data existence area;

the disclosure restricted data type management information that stores, in association with each other, the name of the disclosure restricted data existence area and the information of the type of disclosure restricted data whose disclosure is restricted in the disclosure restricted data existence area;

disclosure restricted data type acquisition unit:

a disclosure restriction type information source from the disclosure restriction information source management information;

acquires the information of the type of the disclosure restricted data from the acquired disclosure restriction type information source;

compares the acquired information of the type of the disclosure restricted data with the information of the type of the disclosure restricted data stored in the disclosure restricted data type management information, and acquires difference information of type of disclosure restricted data which is stored in the acquired information of the type of the disclosure restricted data, but is not stored in the information of the type of the disclosure restricted data stored in the disclosure restricted data type management information;

stores the acquired the difference information of type of disclosure restricted data and the name of the disclosure restricted data existence area in the disclosure restricted data type management information;

the disclosure restricted data detection unit scans the virtual volumes;

stores, in association with each other, the disclosure restricted data existence information indicating that the virtual volume stores disclosure restricted data, and the virtual volume ID of the scanned virtual volume, in the virtual volume management information, when at least one data whose type is the type of the disclosure restricted data which is restricted to disclose and which is associated with a name of the disclosure restricted data existence area corresponding to the scanned virtual volume in the disclosure restricted data type management information is detected from the scanned virtual volume;

stores, in association with each other, the disclosure restricted data existence information indicating that the virtual volume does not store disclosure restricted data, and the virtual volume ID of the scanned virtual volume, in the virtual volume management information, when the data whose type is the type of the disclosure restricted data which is restricted to disclose and which is associated with a name of the disclosure restricted data existence area corresponding to the scanned virtual volume in the disclosure restricted data type management information is not detected from the scanned virtual volume.

5. The data sharing system according to claim 1, wherein: the storage nodes are provided in a plurality of disclosure restricted data existence areas.

6. The data sharing system according to claim 1, wherein: the data sharing system comprises, as the storage node, a storage node of a cloud environment and a storage node of an on-premises environment.

7. A data sharing method of a data sharing system comprising a storage node having virtual volumes accessed by a readout device, wherein the storage node comprising a processor and a memory unit, the method comprising: by the processor, restricting, by an access setting unit, a target readout device from reading data from a target virtual volume in accordance with information on a location of the target readout device accessing the data sharing system and information on a location of the target virtual volume from which the target readout device attempts to read the data, wherein the memory unit is configured to store data readable area management information that stores, in association with each other, a name of a disclosure restricted data existence area in which the virtual volume exists, and a name of a data readable area permitted to disclose disclosure restricted data which is stored in the virtual volume and which is restricted to disclose to an outside of the disclosure restricted data existence area corresponding to the virtual volume storing the disclosure restricted data, and wherein the access setting unit, when the target readout device specifying information which can specify the target readout device, and the target virtual volume specifying information which can specify the target virtual volume, are input:

does not permit the target readout device to read data from the target virtual volume, in a case where the target virtual volume stores the disclosure restricted data, and in the data readable area management information, the target data readable area indicated by the name of the data readable area associated with the name of the disclosure restricted data existence area in which the target virtual volume exists, does not include an position where the target readout device exists; and permit the target readout device to read data from the target virtual volume, at least in two case, the case where the target virtual volume does not stores the disclosure restricted data, and the case where the target virtual volume stores the disclosure restricted data, and in the data readable area management information, the data readable area indicated by the name of the data readable area associated with the name of the disclosure restricted data existence area in which the target virtual volume exists, include the position where the target readout device exists.

* * * * *